(12) United States Patent
Kim et al.

(10) Patent No.: US 12,340,809 B2
(45) Date of Patent: *Jun. 24, 2025

(54) ELECTRONIC DEVICE CONFIGURED TO PERFORM ACTION USING SPEECH RECOGNITION FUNCTION AND METHOD FOR PROVIDING NOTIFICATION RELATED TO ACTION USING SAME

(71) Applicant: SAMSUNG ELECTRONICS CO., LTD., Suwon-si (KR)

(72) Inventors: Taegu Kim, Suwon-si (KR); Gajin Song, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,045

(22) Filed: Nov. 6, 2023

(65) Prior Publication Data

US 2024/0071390 A1    Feb. 29, 2024

Related U.S. Application Data

(63) Continuation of application No. 18/168,166, filed on Feb. 13, 2023, now Pat. No. 11,810,571, which is a
(Continued)

(30) Foreign Application Priority Data

Sep. 4, 2019   (KR) .................. 10-2019-0109371

(51) Int. Cl.
   *G10L 15/00*   (2013.01)
   *G06F 16/9032*   (2019.01)
(Continued)

(52) U.S. Cl.
   CPC ........ *G10L 15/26* (2013.01); *G06F 16/90332* (2019.01); *G10L 15/22* (2013.01); *G10L 2015/228* (2013.01)

(58) Field of Classification Search
   CPC ... G10L 15/22; G10L 15/26; G10L 2015/223; G10L 2015/228; G06F 16/90332; G06F 3/038
   See application file for complete search history.

(56) References Cited

U.S. PATENT DOCUMENTS 7,519,537 B2 *   4/2009   Rosenberg .............. G06F 3/038
                                                         704/271
9,530,409 B2   12/2016   Bartnik
(Continued)

FOREIGN PATENT DOCUMENTS

CN   108268235 A   7/2018
CN   109144458 A   1/2019
(Continued)

OTHER PUBLICATIONS

Partial European Search Report dated Apr. 30, 2021 in connection with European Patent Application No. 20 19 4357, 9 pages.
(Continued)

*Primary Examiner* — Md S Elahee

(57) ABSTRACT

A method includes receiving a designated event related to a second application while an execution screen of a first application is displayed on a display. The method also includes executing an artificial intelligent application in response to the designated event. The method further includes transmitting data related to the designated event to an external server, based on the executed artificial intelligent application. Additionally, the method includes sensing a user utterance related to the designated event for a designated period of time. The method also includes transmitting the user utterance to the external server. The method further
(Continued)

includes receiving an action order for performing a function related to the user utterance from the external server. The method also includes executing the second application at least based on the received action order. The method further includes outputting a result of performing the function by using the second application.

20 Claims, 16 Drawing Sheets

Related U.S. Application Data continuation of application No. 17/013,387, filed on Sep. 4, 2020, now Pat. No. 11,580,987.

(51) Int. Cl.
  *G10L 15/22* (2006.01)
  *G10L 15/26* (2006.01)

(56) References Cited

U.S. PATENT DOCUMENTS

| | | | |
|---|---|---|---|
| 10,043,516 | B2 | 8/2018 | Saddler et al. |
| 10,313,845 | B2 | 6/2019 | Koul |
| 10,540,973 | B2 | 1/2020 | Jaygarl et al. |
| 10,679,608 | B2 | 6/2020 | Mixter et al. |
| 10,999,627 | B2 | 5/2021 | Bugajski et al. |
| 11,264,019 | B2 | 3/2022 | Bhattacharya et al. |
| 2004/0078440 | A1 | 4/2004 | Potter et al. |
| 2013/0080178 | A1 | 3/2013 | Kang et al. |
| 2014/0207468 | A1 | 7/2014 | Bartnik |
| 2016/0260436 | A1 | 9/2016 | Lemay et al. |
| 2016/0291831 | A1 | 10/2016 | Baek |
| 2017/0025122 | A1 | 1/2017 | Choi |
| 2017/0345421 | A1 | 11/2017 | Jin |
| 2018/0322880 | A1 | 11/2018 | Vuskovic et al. |
| 2018/0374481 | A1 | 12/2018 | Jaygarl et al. |
| 2019/0005957 | A1 | 1/2019 | Yoon |
| 2019/0051298 | A1 | 2/2019 | Lee et al. |
| 2019/0074010 | A1 | 3/2019 | Horling et al. |
| 2019/0196779 | A1 | 6/2019 | DeClerck et al. |

FOREIGN PATENT DOCUMENTS

| | | |
|---|---|---|
| CN | 110018735 A | 7/2019 |
| CN | 118057527 A | 5/2024 |
| EP | 3493200 A1 | 6/2019 |
| KR | 20140105340 A | 9/2014 |
| KR | 10-2015-0009102 A | 1/2015 |
| KR | 20150029197 A | 3/2015 |
| KR | 20170010494 A | 2/2017 |
| KR | 20170135623 A | 12/2017 |
| KR | 20190017548 A | 2/2019 |
| KR | 20190068133 A | 6/2019 |
| KR | 20190001699 U | 7/2019 |
| KR | 102011036 B1 | 8/2019 |

OTHER PUBLICATIONS

International Search Report dated Nov. 20, 2020 in connection with International Patent Application No. PCT/KR2020/010809, 3 pages.
Written Opinion of the International Searching Authority dated Nov. 20, 2020 in connection with International Patent Application No. PCT/KR2020/010809, 4 pages.
Communication pursuant to Article 94(3) EPC dated May 27, 2024, in connection with European Patent Application No. 20194357.8, 6 pages.
The First Office Action issued Jan. 24, 2025, in connection with Chinese Patent Application No. 202010817381.8, 41 pages.

* cited by examiner

ELECTRONIC DEVICE CONFIGURED TO PERFORM ACTION USING SPEECH RECOGNITION FUNCTION AND METHOD FOR PROVIDING NOTIFICATION RELATED TO ACTION USING SAME

CROSS-REFERENCE TO RELATED APPLICATION

This application is a continuation of U.S. application Ser. No. 18/168,166 filed Feb. 13, 2023, now U.S. Pat. No. 11,810,571 issued Nov. 7, 2023, which is a continuation of U.S. application Ser. No. 17/013,387 filed Sep. 4, 2020, now U.S. Pat. No. 11,580,987 issued Feb. 14, 2023, which is based on and claims priority under 35 U.S.C. 119 to Korean Patent Application No. 10-2019-0109371 filed on Sep. 4, 2019 in the Korean Intellectual Property Office, the disclosure of which is herein incorporated by reference in its entirety.

BACKGROUND

1. Field

Various embodiments relate to an electronic device configured to perform an artificial intelligent action using a speech recognition function, and a method for providing a notification related to an action using the same.

2. Description of Related Art

In line with the recent development of speech recognition technology, a speech recognition function may be implemented in various electronic devices having a voice input device (for example, microphone). For example, an electronic device may recognize a user utterance through the speech recognition function, determine the intent of the user utterance, and perform an action corresponding to the intent.

The above information is presented as background information only to assist with an understanding of the disclosure. No determination has been made, and no assertion is made, as to whether any of the above might be applicable as prior art with regard to the disclosure.

SUMMARY

In the case of an electronic device having a speech recognition function according to the prior art, if an event has occurred, and if the corresponding event is to be identified, or if an action related thereto is to be performed through an intelligence application, a separate input for executing the intelligence application may be required. For example, as a method for activating the intelligence application, an additional user input may be required, such as a wake-up utterance, or pressing of a physical button.

Various embodiments may provide an electronic device and a method, in order to solve the above-mentioned problem, wherein if an event has occurred, an artificial intelligent action using the speech recognition function can be performed more easily.

An electronic device according to an embodiment may include: a communication circuit: a display; a microphone; a processor operatively connected to the communication circuit, the display, and the microphone; and a memory operatively connected to the processor. The memory may be configured to store instructions that, when executed, cause the processor to: receive a designated event related to a second application while an execution screen of a first application is displayed on the display; execute an artificial intelligent application in response to the designated event; transmit data related to the designated event to an external server through the communication circuit, based on the executed artificial intelligent application; sense a user utterance related to the designated event for a designated period of time through the microphone; transmit the user utterance, in case that the user utterance is sensed, to the external server through the communication circuit; receive an action order for performing a function related to the user utterance from the external server through the communication circuit; execute the second application at least based on the received action order; and output a result of performing the function by using the second application.

An electronic device according to an embodiment may include: a communication circuit: a display; a microphone; a processor operatively connected to the communication circuit, the display, and the microphone; and a memory operatively connected to the processor. The memory may be configured to store instructions that, when executed, cause the processor to: receive a designated event related to a second application while an execution screen of a first application is displayed on the display; execute an artificial intelligent application in response to the designated event; pre-analyze data related to the designated event, based on the executed artificial intelligent application; sense a user utterance related to the designated event for a designated period of time through the microphone; determine an action order for performing a function related to the user utterance, based on a result of pre-analyzing the data, in case that the user utterance is sensed; execute the second application at least based on the determined action order; and output a result of performing the function by using the second application.

A method for performing an action using a speech recognition function by an electronic device, according to an embodiment, may include the operations of: receiving a designated event related to a second application while an execution screen of a first application is displayed on a display; executing an artificial intelligent application in response to the designated event; transmitting data related to the designated event to an external server through a communication circuit, based on the executed artificial intelligent application; sensing a user utterance related to the designated event for a designated period of time through a microphone; transmitting the user utterance, in case that the user utterance is sensed, to the external server through the communication circuit; receiving an action order for performing a function related to the user utterance from the external server through the communication circuit; executing the second application at least based on the received action order; and outputting a result of performing the function by using the second application.

A method for performing an action using a speech recognition function by an electronic device, according to an embodiment, may include the operations of: receiving a designated event related to a second application while an execution screen of a first application is displayed on a display; executing an artificial intelligent application in response to the designated event; pre-analyzing data related to the designated event, based on the executed artificial intelligent application; sensing a user utterance related to the designated event for a designated period of time through a microphone; determining an action order for performing a function related to the user utterance, based on a result of pre-analyzing the data, in case that the user utterance is sensed; executing the second application at least based on the determined action order; and outputting a result of performing the function by using the second application.

The electronic device configured to perform an artificial intelligent action using a speech recognition function and the method for providing a notification related to an action using the same, according to various embodiments, may perform an artificial intelligent action using the speech recognition function more easily if an event has occurred.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
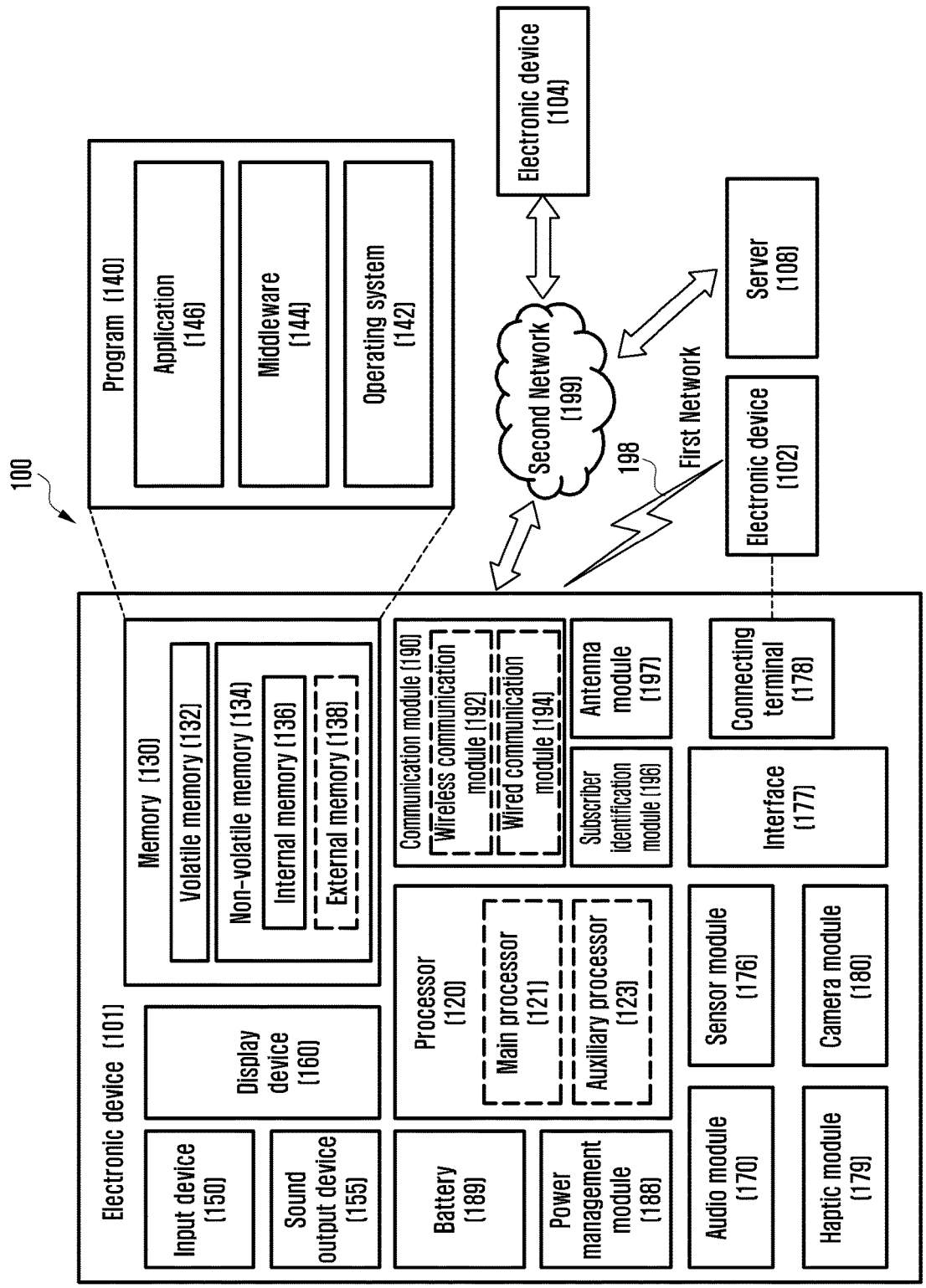
FIG. 1 illustrates a block diagram of an electronic device inside a network according to an embodiment.

FIG. 1 illustrates a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device (for example, 101 in FIG. 1) according to an embodiment may include; a communication circuit (for example, communication module 190 in FIG. 1); a display (for example, 160 in FIG. 1); a microphone (for example, 173 in FIG. 2A); a processor (for example, 120 in FIG. 1) operatively connected to the communication circuit (for example, communication module 190 in FIG. 1), the display (for example, 160 in FIG. 1), and the microphone (for example, 173 in FIG. 2A); and a memory (for example, 130 in FIG. 1) operatively connected to the processor 120. The memory 130 may store instructions that, when executed, cause the processor 120 to: receive a designated event related to a second application (for example, 135_2 in FIG. 2A) while an execution screen of a first application (for example, 135_1 in FIG. 2A) is displayed on the display 160; execute an artificial intelligent application (for example, 752 in FIG. 7) in response to the designated event; transmit data related to the designated event to an external server (for example, 201 in FIG. 2A) through the communication module 190, based on the executed artificial intelligent application 752; sense a user utterance related to the designated event for a designated period of time through the microphone 173; transmit the user utterance, if the user utterance is sensed, to the intelligence server 201 through the communication module 190; receive an action order for performing a function related to the user utterance from the intelligence server 201 through the communication module 190; execute the second application 135_2 at least based on the received action order; and output a result of performing the function by using the second application 135_2. The instructions may be configured to cause the processor 120 to: activate the microphone 173 if the artificial intelligent application 752 is executed in response to the designated event; and deliver the user utterance acquired through the activated microphone 173 to the artificial intelligent application 752. The data related to the designated event may include at least one of identification information of the second application 135_2, the time at which the designated event occurred, or the type of the designated event. The instructions may be configured to cause the processor 120 to: display a user interface of selecting an application for the designated period of time on the display 160, in response to receiving the designated event; and start sensing the user utterance if a user input of selecting the second application 135_2 is received through the user interface. The instructions may be configured to cause the processor 120 to: output a result of performing the function by using the second application 135_2 in a voice type, graphic type, or text type. The instructions may be configured to cause the processor 120 to: execute the artificial intelligent application 752 in response to receiving the designated event related to the second application 135_2 while the display 160 is deactivated; transmit the data related to the designated event to the intelligence server 201 through the communication module 190, based on the executed artificial intelligent application 752; sense the user utterance related to the designated event for the designated period of time through the microphone 173; transmit the user utterance, if the user utterance is sensed, to the intelligence server 201 through the communication module 190; receive the action order for performing the function related to the user utterance from the intelligence server 201 through the communication module 190; execute the second application 135_2 at least based on the received action order; and output a result of performing the function by using the second application 135_2. The instructions may be configured to cause the processor 120 to: identify a user configuration regarding the first application 135_1 if the designated event is received while the execution screen of the first application 135_1 is displayed on the display 160; and determine whether or not to execute the artificial intelligent application 752 based on the user configuration.

An electronic device 101 according to an embodiment may include: a communication module 190: a display 160; a microphone 173; a processor 120 operatively connected to the communication module 190, the display 160, and the microphone 173; and a memory 130 operatively connected to the processor 120. The memory 130 may store instructions that, when executed, cause the processor 120 to: receive a designated event related to a second application 135_2 while an execution screen of a first application 135_1 is displayed on the display 160; execute an artificial intelligent application 752 in response to the designated event; pre-analyze data related to the designated event, based on the executed artificial intelligent application 752; sense a user utterance related to the designated event for a designated period of time through the microphone 173; determine an action order for performing a function related to the user utterance, based on a result of pre-analyzing the data, if the user utterance is sensed; execute the second application 135_2 at least based on the determined action order; and output a result of performing the function by using the second application 135_2. The instructions may be configured to cause the processor 120 to: activate the microphone 173 if the artificial intelligent application 752 is executed in response to the designated event; and deliver the user utterance acquired through the activated microphone 173 to the artificial intelligent application 752. The data related to the designated event may include at least one of identification information of the second application 135_2, the time at which the designated event occurred, or the type of the designated event. The instructions may be configured to cause the processor 120 to: display a user interface of selecting an application for the designated period of time on the display 160, in response to receiving the designated event; and start sensing the user utterance if a user input of selecting the second application 135_2 is received through the user interface. The instructions may be configured to cause the processor 120 to: execute the artificial intelligent application 752 in response to receiving the designated event related to the second application 135_2 while the display 160 is deactivated; pre-analyze the data related to the designated event, based on the executed artificial intelligent application 752; sense the user utterance related to the designated event for the designated period of time through the microphone 173; determine an action order for performing a function related to the user utterance, based on a result of pre-analyzing the data, if the user utterance is sensed; execute the second application 135_2 at least based on the determined action order; and output a result of performing the function by using the second application 135_2. The instructions may be configured to cause the processor 120 to: identify a user configuration regarding the first application 135_1 if the designated event is received while the execution screen of the first application 135_1 is displayed on the display 160; and determine whether or not to execute the artificial intelligent application 752 based on the user configuration.

Figure 2A:
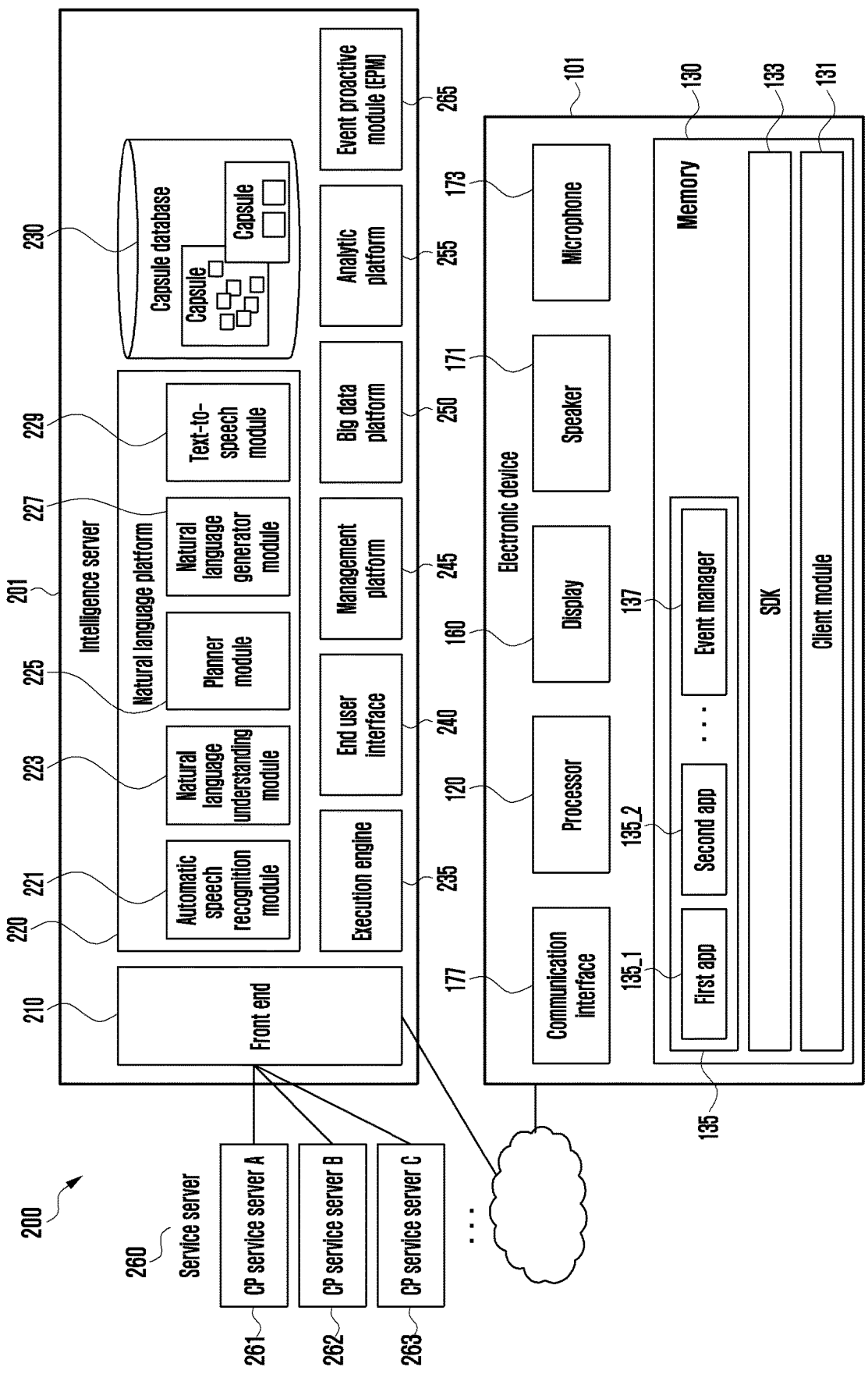
FIG. 2A illustrates a block diagram of an integrated intelligence system according to an embodiment.

FIG. 2A illustrates a block diagram 200 of an integrated intelligence system according to an embodiment.

Referring to FIG. 2A, the integrated intelligence system of block diagram 200 according to an embodiment may include an electronic device 101, an intelligence server 201, and a service server 260.

In an embodiment, the electronic device 101 may be a terminal device that can be connected to the Internet, and may be, for example, a mobile phone, a smartphone, a personal digital assistant (PDA), a laptop computer, a TV, a home appliance, an HMD, or a smart speaker.

According to an embodiment, the electronic device 101 may include a communication interface (for example, interface 177 in FIG. 1), a microphone 173, a speaker 171, a display (for example, display device 160 in FIG. 1), a memory (for example, memory 130 in FIG. 1), or a processor (for example, processor 120 in FIG. 1). The enumerated elements may be operatively or electrically connected to each other.

According to an embodiment, the communication interface 177 may be connected to an external device (for example, electronic device 102 or 104 or server 108 in FIG. 1) and configured to transmit/receive data. According to an embodiment, the microphone 173 may receive a sound (for example, user utterance) and convert the same into an electric signal. According to an embodiment, the speaker 171 may output the electric signal as a sound (for example, voice). According to an embodiment, the display 160 may be configured to display images or videos. According to an embodiment, the display 160 may display a graphic user interface (GUI) of an executed app (or application program).

According to an embodiment, the memory 130 may store a client module 131, a software development kit 133, and multiple apps 135. The client module 131 and the SDK 133 may constitute a framework (or solution program) for performing a versatile function. In addition, the memory 130 and the client module 131 or the SDK 133 may constitute a framework for processing a voice input.

According to an embodiment, the multiple apps 135 stored in the memory 130 may be programs for performing a designated function. According to an embodiment, the multiple apps 135 may include a first app 135_1, a second app 135_2, or an event manager 173. According to an embodiment, each of the multiple apps 135 may include multiple actions for performing a designated function. For example, the multiple apps 135 may include at least one of an alarm app, a message app, and a schedule app. According to an embodiment, the multiple apps 135 may be executed by the processor 120 so as to successively execute at least some of the multiple actions.

According to an embodiment, the event manager 137 may determine an app (or domain) to process an event that occurred in the electronic device 101, based on a configuration value input by the user. For example, if a designated event has occurred in the electronic device 101, the event manager 137 according to an embodiment may identify a configuration value regarding the currently executed app and may determine whether or not to execute a follow-up action related to the designated event, based on the configuration value. According to an embodiment, the event manager 137 may ignore the designated event based on the configuration value corresponding to the currently executed app, or may transmit information (or data) related to the designated event to an artificial intelligent (AI) system (for example, event proactive module (EPM) 265) through a client module 131.

According to an embodiment, the memory 130 of the electronic device 101 may store multiple intelligence apps. According to an embodiment, the multiple intelligence apps may be based on speech recognition, and the electronic device 101 may preconfigure a default app (or root app) from the multiple intelligence apps based on a user input. For example, the electronic device 101 may have multiple intelligence apps installed therein, such as BIXBY™ or GOOGLE ASSISTANT™, and may configure the BIXBY™ app as the default app based on a user input. According to an embodiment, the event manager 137 may arrange an event designated based on the configuration value of the currently executed app such that the same is processed by the intelligence app configured as the default app. Accordingly, the electronic device 101 may process a user utterance flexibly even if multiple intelligence apps are installed therein. For example, if a designated event (for example, message reception) occurs while the Google ASSISTANT™ app is executed, and if a user utterance is received after the designated event has occurred, the electronic device 101 according to an embodiment may process the user utterance in the BIXBY™ app, which has been configured as the default app.

According to an embodiment, the processor 120 may control the overall action of the electronic device 101. For example, the processor 120 may be electrically connected to the communication interface 177, the microphone 173, the speaker 171, the display 160, and the memory 130 so as to perform a designated action.

According to an embodiment, the processor 120 may also execute a program stored in the memory 130, thereby performing a designated function. For example, the processor 120 may execute at least one of the client module 131 or the SDK 133, thereby performing a follow-up action for processing a voice input. The processor 120 may control actions of multiple apps 135 through the SDK 133, for example. The follow-up action, which is described as an action of the client module 131 or the SDK 133, may be an action resulting from execution of the processor 120.

According to an embodiment, the client module 131 may receive a voice input. For example, the client module 131 may receive a voice signal corresponding to a user utterance sensed through the microphone 173. The client module 131 may transmit the received voice input to the intelligence server 201. According to an embodiment, the client module 131 may transmit state information of the electronic device 101 to the intelligence server 201, together with the received voice input. The state information may be information regarding the state of execution of an app, for example.

According to an embodiment, the client module 131 may receive a result corresponding to the received voice input. For example, the client module 131 may receive a result corresponding to the voice input from the intelligence server 201. The client module 131 may display the received result on the display 160.

According to an embodiment, the client module 131 may receive a plan corresponding to the received voice input. The client module 131 may display the result of executing multiple actions of an app according to the plan on the display 160. For example, the client module 131 may successively display results of executing multiple actions on the display 160. As another example, the electronic device 101 may display only some of the results of executing multiple actions (for example, result of the last action) on the display 160.

According to an embodiment, the client module 131 may receive a request for acquiring information for obtaining a result corresponding to a voice input from the intelligence server 201. The information for obtaining a result may be, for example, state information of the electronic device 101. According to an embodiment, the client module 131 may transmit the necessary information to the intelligence server 201 in response to the request.

According to an embodiment, the client module 131 may transmit information regarding results of executing multiple actions according to the plan to the intelligence server 201. The intelligence server 201 may confirm, based on the result information, that the received voice input has been correctly processed.

According to an embodiment, the client module 131 may include a speech recognition module (not illustrated). According to an embodiment, the client module 131 may receive a voice input for performing a limited function through the speech recognition module (not illustrated). For example, the client module 131 may execute an intelligence app (or AI app) (for example, BIXBY™) for processing a voice input for performing an organic action through a designated input (for example, Wake up!).

According to an embodiment, the intelligence server 201 may receive information related to a user voice input from the electronic device 101 through a communication network. According to an embodiment, the intelligence server 201 may convert data related to the receive user voice input into text data. According to an embodiment, the intelligence server 201 may produce, based on the text data, a plan for performing a task (for example, function) corresponding to the user voice input.

According to an embodiment, the plan (for example, action order) may be produced by an artificial intelligent (AI) system. The AI system may be a rule-based system, or may be a neural network-based system (for example, feed-forward neural network (FNN) or recurrent neural network (RNN)). Alternatively, the AI system may be a combination of the above-mentioned systems, or may be an AI system different therefrom. According to an embodiment, the plan may be selected from a predefined set of plans, or may be produced in real time in response to a user request. For example, the AI system may select at least one plan from multiple predefined plans.

According to an embodiment, the intelligence server 201 may transmit a result following the produced plan to the electronic device 101 or may transmit the produced plan to the electronic device 101. According to an embodiment, the electronic device 101 may display a result obtained according to the plan on the display 160. According to an embodiment, the electronic device 101 may display the result of executing an action according to the plan on the display 160. According to an embodiment, the electronic device 101 may output the result of executing an action according to the plan in a voice type, graphic type, or text type.

The intelligence server 201 according to an embodiment may include a front end 210, a natural language platform 220, a capsule DB 230, an execution engine 235, an end user interface 240, a management platform 245, a big data platform 250, an analytic platform 255, or an event proactive module (EPM) 265.

According to an embodiment, the front end 210 may receive a voice input from the electronic device 101. The front end 210 may transmit a response corresponding to the voice input.

According to an embodiment, the natural language platform 220 may include an automatic speech recognition (ASR) module 221, a natural language understanding (NLU) module 223, a planner module 225, a natural language generator (NLG) module 227, or a text-to-speech (TTS) module 229.

According to an embodiment, the ASR module 221 may convert a voice input received from the electronic device 101 into text data. According to an embodiment, the NLU module 223 may identify the user's intent by using the text data of the voice input. For example, the NLU module 223 may identify the user's intent by performing syntactic analysis or sematic analysis. According to an embodiment, the NLU module 223 may identify the meaning of a word extracted from the voice input by using a linguistic feature (for example, syntactic element) of a morpheme or a phrase, and may match the identified meaning of the word with an intent, thereby determining the user's intent.

According to an embodiment, the planner module 225 may produce a plan by using the intent determined by the NLU module 223 and a parameter. According to an embodiment, the planner module 225 may determine multiple domains necessary to perform a task based on the determine intent. The planner module 225 may determine multiple actions included in each of the multiple domains determined based on the intent. According to an embodiment, the planner module 225 may determine a parameter necessary to execute the multiple determined actions, or a result value output by executing the multiple actions. The parameter and the result value may defined as concepts related to a designated format (or class). Accordingly, the plan may include multiple actions determine by the user's intent, and multiple concepts. The planner module 225 may determine the relation between the multiple actions and the multiple concepts in a stepwise (or hierarchical) manner. For example, the planner module 225 may determine the order of executing multiple actions determined based on the user's intent based on multiple concepts. In other words, the planner module 225 may determine the order of executing multiple actions, based on a parameter necessary to execute the multiple actions and a result output by executing the multiple actions. Accordingly, the planner module 225 may produce a plan including association information (for example, ontology) between the multiple actions and the multiple concepts. The planner module 225 may produce a plan by using information stored in the capsule DB 230 that stores a set of relations between concepts and actions.

According to an embodiment, the NLG module 227 may convert designated information into a text type. The information converted into a text type may be of a natural language utterance type. The TTS module 229 in an embodiment may convert text-type information into voice-type information.

According to an embodiment, the capsule DB 230 may store information regarding the relation between multiple concepts and actions corresponding to multiple domains. For example, the capsule DB 230 may include multiple action objects (or action information) of a plan and concept objects (or concept information) thereof. According to an embodiment, the capsule DB 230 may store multiple capsules in a concept action network (CAN) type. According to an embodiment, the multiple capsules may be stored in a function registry included in the capsule DB 230.

According to an embodiment, the capsule DB 230 may include a strategy registry that stores strategy information necessary to determine a plan corresponding to a voice input. The strategy information may include, if there are multiple plans corresponding to a voice input, reference information for determining one plan. According to an embodiment, the capsule DB 230 may include a follow-up registry that stores follow-up action information for proposing a follow-up action to the user in a designated situation. The follow-up action may include, for example, a follow-up utterance. According to an embodiment, the capsule DB 230 may include a layout registry that stores layout information of information output through the electronic device 101. According to an embodiment, the capsule DB 230 may include a vocabulary registry that stores vocabulary information included in capsule information. According to an embodiment, the capsule DB 230 may include a dialog registry that stores information regarding a dialog (or interaction) with the user.

According to an embodiment, the capsule DB 230 may update a stored object through a developer tool. The developer tool may include, for example, a function editor for updating an action object or a concept object. The developer tool may include a vocabulary editor for updating vocabularies. The developer tool may include a strategy editor for producing and registering a strategy for determining a plan. The developer tool may include a dialog editor for producing a dialog with the user. The developer tool may include a follow-up editor capable of activating a follow-up objective and editing a follow-up utterance that provides a hint. The follow-up objective may be determined based on the currently configured objective, the user's preference, or environment condition.

According to an embodiment, the capsule DB 230 may also be implemented inside the electronic device 101. In other words, the electronic device 101 may include a capsule DB 230 that stores information for determining an action corresponding to a voice input.

According to an embodiment, the execution engine 235 may obtain a result by using the produced plan. According to an embodiment, the end user interface 240 may transmit the obtained result to the electronic device 101. Accordingly, the electronic device 101 may receive the result and provide the received result to the user. According to an embodiment, the management platform 245 may manage information used by the intelligence server 201. According to an embodiment, the big data platform 250 may collect the user's data.

According to an embodiment, the analytic platform 255 may manage the quality of service (QoS) of the intelligence server 201. For example, the analytic platform 255 may manage elements of the intelligence server 201 and the processing rate (or efficiency) thereof.

According to an embodiment, the service server 260 may provide a designated service (for example, food ordering or hotel reservation) to the electronic device 101. According to an embodiment, the service server 260 may be run by a third party. For example, the service server 260 may include a first service server 261, a second service server 262, and a third service server 263 run by different third parties. According to an embodiment, the service server 260 may provide the intelligence server 201 with information for producing a plan corresponding to a received voice input. The provided information may be stored, for example, in the capsule DB 230. In addition, the service server 260 may provide the intelligence server 201 with information regarding the result following the plan.

According to an embodiment, if a designated event (for example, message reception) has occurred in the electronic device 101, the EPM 265 may pre-analyze data related to the event, and may determine an app (or domain) to process a user utterance received by the electronic device 101 after occurrence of the event. For example, the EPM 265 may determine, according to the data, whether to process a user utterance received after occurrence of the event by the app currently executed in the electronic device 101 or to determine the user utterance as a root utterance such that the same is processed by a new app (or domain).

According to an embodiment, the data related to the event may include at least one of identification information of a first app currently executed in the electronic device 101, identification information of a second app related to the event, event occurrent time, or event type. The EPM 265 may receive the data from the electronic device 101 and may pre-analyze the received data before a user utterance. According to an embodiment, if the electronic device 101 senses a user utterance, the EPM 265 may determine an app (or domain) to process the user utterance based on the result of pre-analysis. For example, if the first app is currently executed in the electronic device 101, and if a task corresponding to a user utterance can be performed through the second app, the EPM 265 according to an embodiment may determine that the task is to be performed by the second app.

According to an embodiment, if the electronic device 101 has an embedded intelligence platform, the EPM 265 may be included in the electronic device 101. In this case, the electronic device 101 may pre-analyze data related to an event independently of the intelligence server 201 and may determine the domain (for example, application) to process a user utterance received by the electronic device 101 after occurrence of the event (see FIG. 8).

In connection with the integrated intelligence system of block diagram 200 described above, the electronic device 101 may provide the user with various intelligent services in response to a user input. The user input may include, for example, an input through a physical button, a touch input, or a voice input.

According to an embodiment, the electronic device 101 may provide a speech recognition service through an intelligence app (or speech recognition app) stored therein. In this case, for example, the electronic device 101 may recognize a user utterance or a voice input received through the microphone 173, and may provide the user with a service corresponding to the recognized voice input.

According to an embodiment, based on the received voice input, the electronic device 101 may perform a designated action alone or together with the intelligence server 201 and/or the service server 260. For example, the electronic device 101 may execute an app corresponding to the received voice input and may perform a designated action through the executed app.

According to an embodiment, when the electronic device 101 provides a service together with the intelligence server 201 and/or the service server 260, the electronic device 101 may sense a user utterance by using the microphone 173 and may produce a signal (or voice data) corresponding to the sensed user utterance. The electronic device 101 may transmit the voice data to the intelligence server 201 by using the communication interface 177.

According to an embodiment, in response to a voice input received from the electronic device 101, the intelligence server 201 may produce a plan for performing a task corresponding to the voice input, or the result of performing an action according to the plan. The plan may include, for example, multiple actions for performing a task corresponding to the user's voice input and multiple concepts related to the multiple actions. The concepts may correspond to definitions of parameters input to execute the multiple actions or result values output by executing the multiple actions. The plan may include information regarding association between the multiple actions and the multiple concepts.

The electronic device 101 in an embodiment may receive the response by using the communication interface 177. The electronic device 101 may use the speaker 171 to output a voice signal produced inside the electronic device 101 to the outside, or may use the display 160 to output an image produced inside the electronic device 101 to the outside.

Figure 2B:
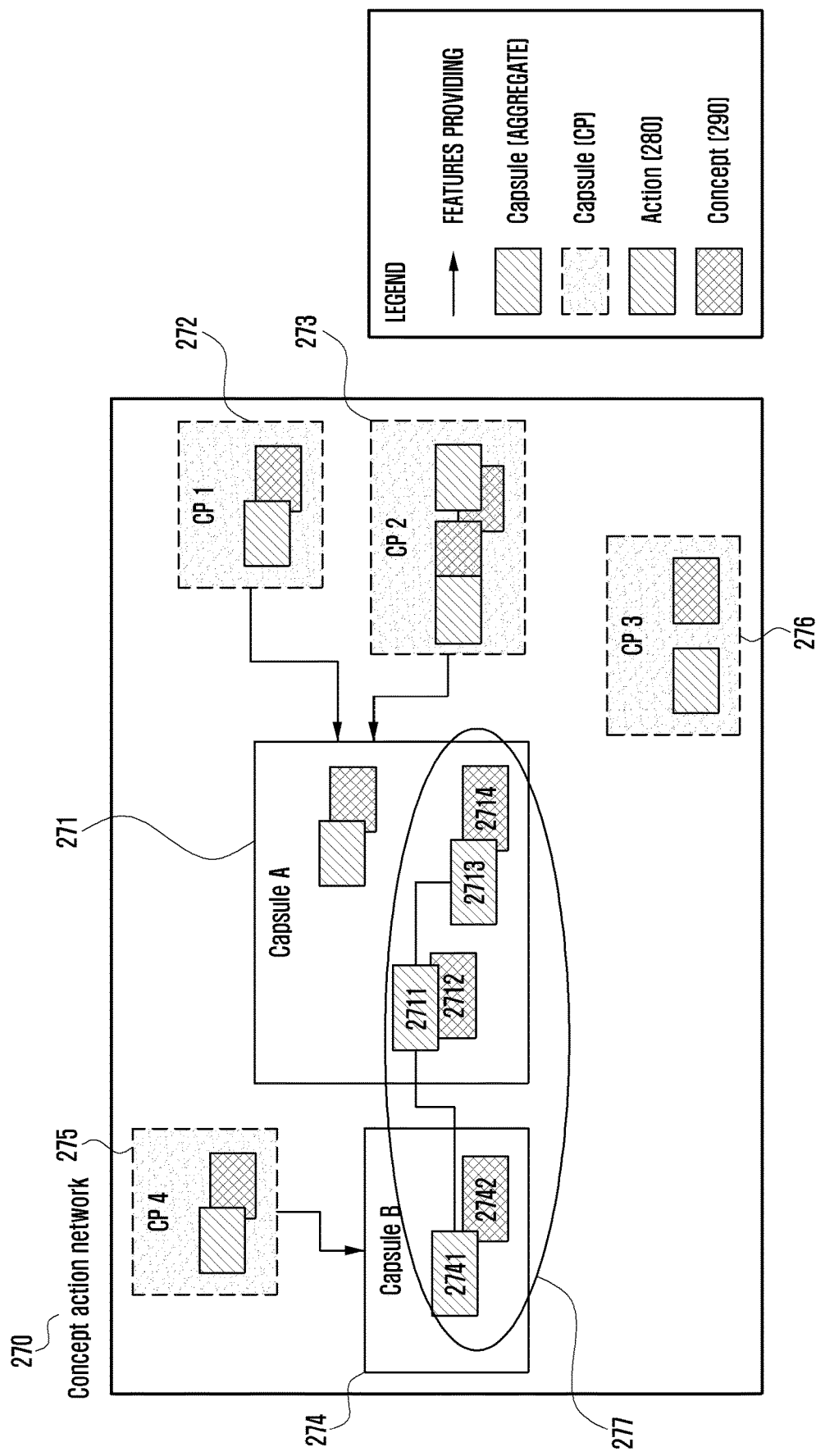
FIG. 2B illustrates a diagram of a type of storage of information regarding the relation between concepts and actions in a database according to an embodiment.

FIG. 2B illustrates a diagram 270 of a type of storage of information regarding the relation between concepts and actions in a database.

Referring to FIG. 2B, the capsule database (for example, capsule database 230 in FIG. 2A) of the intelligence server (for example, intelligence server 201 in FIG. 2A) may store capsules in a concept action network (CAN) type. The capsule database may store an action for processing a task corresponding to the user's voice input and a parameter necessary for the action in the CAN type. The CAN may represent an organic relation between an action and a concept that defines a parameter necessary to perform the action.

The capsule database may store multiple capsules (for example, capsule A 271 and capsule B 274) corresponding to multiple domains (for example, applications), respectively. According to an embodiment, one capsule (for example, capsule A 271) may correspond to one domain (for example, application). In addition, one capsule may correspond to at least one service provider (for example, CP 1 272, CP 2 273, CP 3 276, or CP 275) for performing a function of a domain related to the capsule. According to an embodiment, one capsule may include at least one action 280 for performing a designated function and at least one concept 290.

According to an embodiment, the natural language platform (for example, natural language platform 220 in FIG. 2A) may produce a plan for performing a task corresponding to a received voice input by using a capsule stored in the capsule database. For example, the planner module (for example, planner module 225 in FIG. 2A) of the natural language platform may produce a plan by using a capsule stored in the capsule database. For example, a plan 277 may be produced by using the actions 2711 and 2713 and the concepts 2712 and 2714 of capsule A 271 and the action 2714 and the concept 2742 of capsule B 274.

Figure 3:
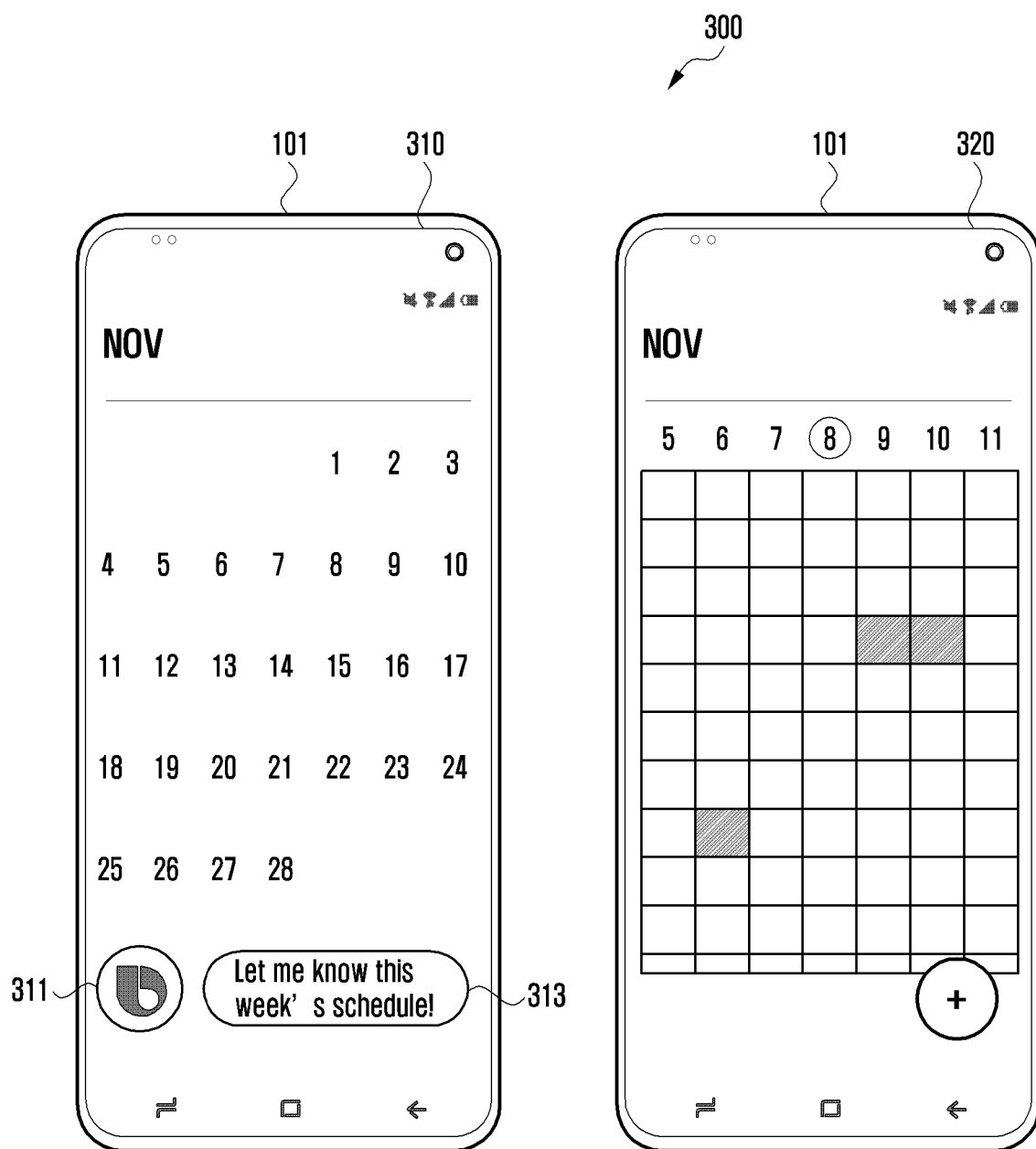
FIG. 3 illustrates a diagram of a screen used by an electronic device according to an embodiment to process a voice input received through an intelligence app.

FIG. 3 illustrates a diagram 300 of a screen used by an electronic device to process a voice input received through an intelligence app.

The electronic device 101 may execute an intelligence app in order to process a user input through an intelligence server 201.

According to an embodiment, on the screen 310, upon receiving a designated voice input (for example, Wake up!) or upon receiving an input through a hardware key (for example, dedicated hardware key or designated physical key), the electronic device 101 may execute an intelligence app for processing the voice input. The electronic device 101 may execute an intelligence app while a schedule app is executed, for example. According to an embodiment, the electronic device 101 may display an object (for example, icon) 311 corresponding to the intelligence app on the display 160. According to an embodiment, the electronic device 101 may receive a voice input resulting from a user utterance. For example, the electronic device 101 may receive a voice input "Let me know this week's schedule!". According to an embodiment, the electronic device 101 may display a user interface (UI) 313 (for example, input window) on which text data of the received voice input is displayed, on the display 160.

According to an embodiment, on the screen 320, the electronic device 101 may display a result corresponding to the received voice input on the display 160. For example, the electronic device 101 may receive a plan corresponding to the received user input, and may display "This week's schedule" on the display 160 according to the plan.

Figure 4:
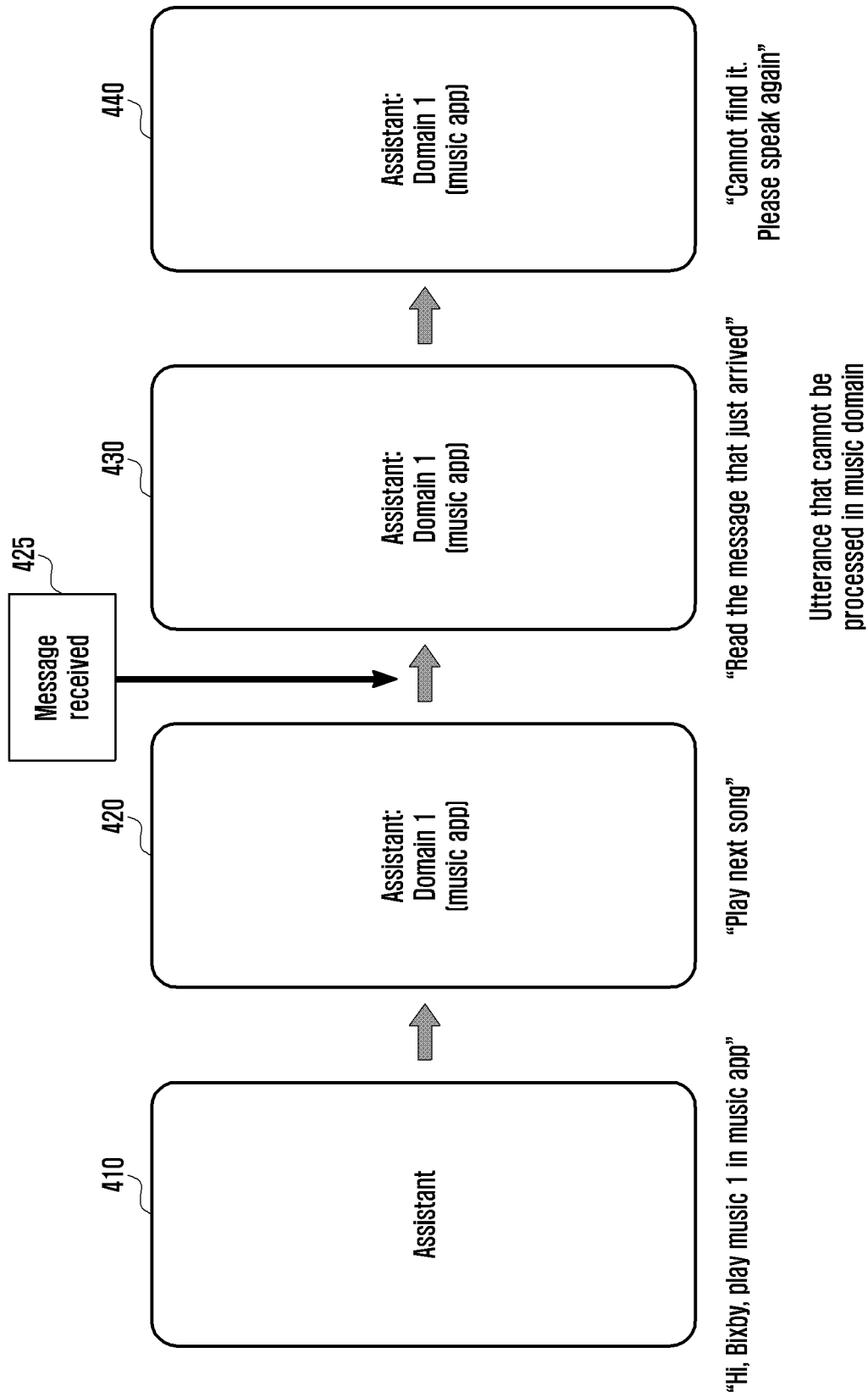
FIG. 4 illustrates a diagram of a screen used by an electronic device according to a comparative example to process an event received through an intelligence app.
Figure 5:
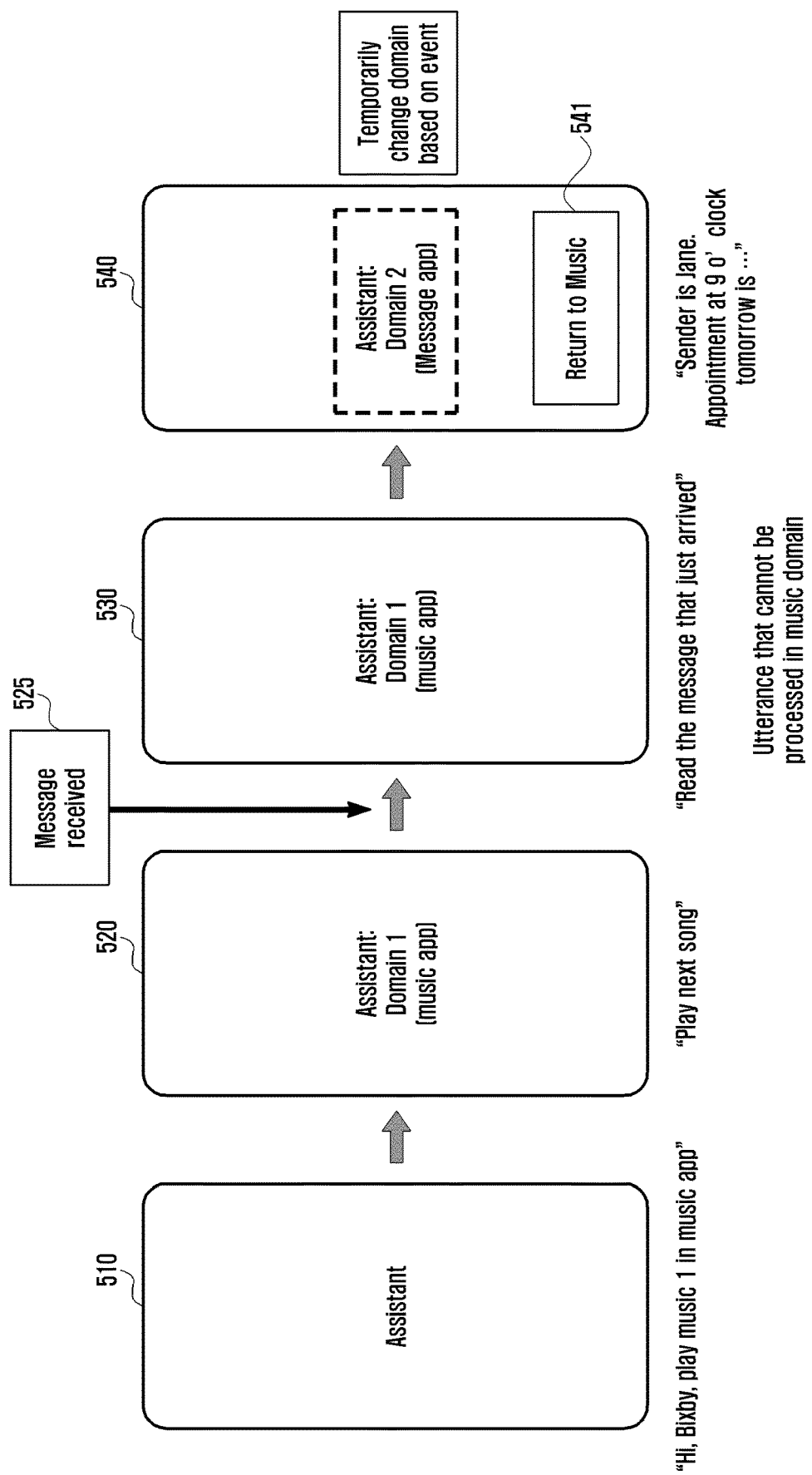
FIG. 5 illustrates a diagram of a screen used by an electronic device according to an embodiment to process an event received through an intelligence app.

FIG. 4 illustrates a diagram of a screen used by an electronic device according to a comparative example to process an event received through an intelligence app. FIG. 5 illustrates a diagram of a screen used by an electronic device according to an embodiment to process an event received through an intelligence app.

Referring to FIG. 4, according to the comparative example, on the screen 410, the electronic device may execute an intelligence app in response to receiving a wake-up utterance (for example, Hi Bixby!!) or receiving an input made by pressing a physical button, and may sense a user utterance by activating a speech recognition function after the intelligence app is executed. For example, on the screen 410 according to the comparative example, if the electronic device receives a user utterance such as "Hi Bixby, play music 1 in music app", the electronic device may execute the music app and play music 1.

According to the comparative example, on the screen 420, the electronic device may receive an additional user utterance while the music app is executed, and if the corresponding user utterance is related to the music app, may process a function related to the user utterance through the music app. For example, on the screen 420 according to the comparative example, if the electronic device receives a user utterance such as "Play the next song", the electronic device may play the next song (for example, music 2) through the music app.

In operation 425, the electronic device according to the comparative example may receive a designated event, for example, a message, while the music app is executed. For example, the designated event may be related to another app (for example, message app) that cannot be processed by the app (for example, music app) currently executed in the electronic device according to the comparative example.

According to the comparative example, on the screen 430, the electronic device may receive a user utterance related to the designated event, after receiving the designated event. For example, on the screen 430, the electronic device may receive a user utterance such as "Read the message that just arrived". Such a user utterance may be related to the designated event that occurred previously, but the designated event and the user utterance may not be processed by the music app (or music domain) currently executed in the electronic device.

According to the comparative example, on the screen 440, upon confirming that the designated event and the user utterance may not be processed by the music app (or music domain) currently executed in the electronic device, the electronic device may inform that the corresponding user utterance cannot be processed. For example, the electronic device according to the comparative example may output an error message such as "Cannot find it. Please speak again".

As such, the electronic device according to the comparative example may have an inconvenience in that, if an event occurs, and if the user wants to check the corresponding event or wants to perform an action related thereto by using a speech recognition function through an intelligence app, the user has to re-input a wake-up utterance or a physical key.

Referring to FIG. 5, the electronic device according to an embodiment (for example, electronic device 101 in FIG. 2A) may solve the inconvenience of the electronic device according to the comparative example in FIG. 4. For example, based on an event such as a notification or an incoming call, the electronic device 101 according to an embodiment may guarantee that the user's utterance is processed more clearly according to the actual intent, even if 1) the terminal is idle (for example, the display is deactivated), 2) if the same has entered a specific app and settled (for example, a state other than punch-out), or 3) if a specific app has an embedded speech recognition service and thus occupies the voice processing module (for example, microphone 173 in FIG. 2A) (for example, punch-out state). Accordingly, a user who has identified occurrence of an event may input an utterance related to the event regardless of the current state of the app in the electronic device 101, or regardless of any state in which a mixture of multiple voice services exists, thereby receiving the result of a task related to the utterance from the electronic device 101. For example, according to an embodiment, if an event has occurred, and if the user wants to check the corresponding event or wants to perform an action related thereto by using a speech recognition function through an intelligence app (for example, BIXBY™ app 752 in FIG. 7), the electronic device 101 may provide a speech recognition function through the intelligence app 752 without requesting the user to re-input a wake-up utterance or a physical key. It is noted that as used herein BIXBY™ app 752 and intelligence app 752 are used interchangeably.

According to an embodiment, on the screen 510, the electronic device 101 may execute an intelligence app 752 in response to receiving a wake-up utterance (for example, Hi Bixby!!) or receiving an input made by pressing a physical button, and may sense a user utterance by activating a speech recognition function after the intelligence app 752 is executed. For example, on the screen 510, if the electronic device 101 receives a user utterance such as "Hi Bixby, play music 1 in music app", the electronic device 101 may execute the music app (for example, first app 135_1 in FIG. 2A) and play music 1.

According to an embodiment, on the screen 520, the electronic device 101 may receive an additional user utterance while the music app 135_1 is executed, and if the corresponding user utterance is related to the music app 135_1, may process a function related to the user utterance through the music app 135_1. For example, on the screen 520, if the electronic device 101 receives a user utterance such as "Play the next song", the electronic device 101 may play the next song (for example, music 2) through the music app 135_1.

In operation 525, the electronic device 101 according to an embodiment may receive a designated event, for example, a message, while the music app 135_1 is executed.

For example, the designated event may be related to another app (for example, second app 135_2 in FIG. 2A) (for example, message app) that cannot be processed by the app (for example, music app 135_1) currently executed in the electronic device 101.

According to an embodiment, on the screen 530, the electronic device 101 may receive a user utterance related to the designated event, after receiving the designated event. For example, on the screen 530, the electronic device 101 may receive a user utterance such as "Read the message that just arrived". Such a user utterance may be related to the designated event that occurred previously, but the designated event and the user utterance may not be processed by the music app 135_1 (or music domain) currently executed in the electronic device 101. According to an embodiment, on the screen 530, the electronic device 101 may sense a user utterance for a designated period of time after receiving the designated event. For example, the electronic device 101 may sense a user utterance for a designated period of time, for example, ten seconds, after receiving the message. According to an embodiment, on the screen 530, if no user utterance is sensed for the designated period of time after receiving the designated event, the electronic device 101 may maintain the execution screen of the app (for example, music app 135_1) before receiving the event. According to an embodiment, ten seconds, as the designated period of time, is only an example, and the same may be variously modified or configured. According to an embodiment, the designated period of time may be substantially identical to the period of time between activation of the display (for example, display device 160 in FIG. 1) and deactivation thereof. For example, the electronic device 101 may activate the display 160 for a designated period of time in response to receiving an event, and may stop the voice receiving action if the display 160 is deactivated after the designated period of time has passed.

According to an embodiment, on the screen 540, upon confirming that the designated event and the user utterance may not be processed by the app (or first app) (for example, music app 135_1) currently executed in the electronic device 101, the electronic device 101 may temporarily execute another app (or second app) (for example, message app 135_2) capable of processing the designated event and the user utterance. The electronic device 101 according to an embodiment may perform a task corresponding to the user utterance and may output the result of performing the task, through the other app (for example, message app 135_2). For example, on the screen 540, electronic device 101 according to an embodiment may output the content of the message received in operation 525 in a voice type, graphic type, or text type, such as "Sender is Jane, Appointment at 9 o'clock tomorrow is . . . ". According to an embodiment, on the screen 540, if a designated period of time passes after performing the task corresponding to the user utterance and outputting the result of performing the task, the electronic device 101 may return to the execution screen of the app (for example, music app 135_1) before receiving the event. According to an embodiment, on the screen 540, the electronic device 101 may display a user interface 541 for returning to the execution screen of the app (for example, music app 135_1) before receiving the event, and if a user input is sensed through the user interface 541, may display the execution screen of the previous app (for example, music app 135_1).

According to an embodiment, in order to return to the execution screen of the previous app (for example, music app 135_1), the electronic device 101 may store a time configuration (for example, timer configuration) for starting connection (for example, session) with the intelligence server (for example, intelligence server 201 in FIG. 2A) from the timepoint at which the event occurred, or information regarding the state of the electronic device before the event occurred.

Figure 6:
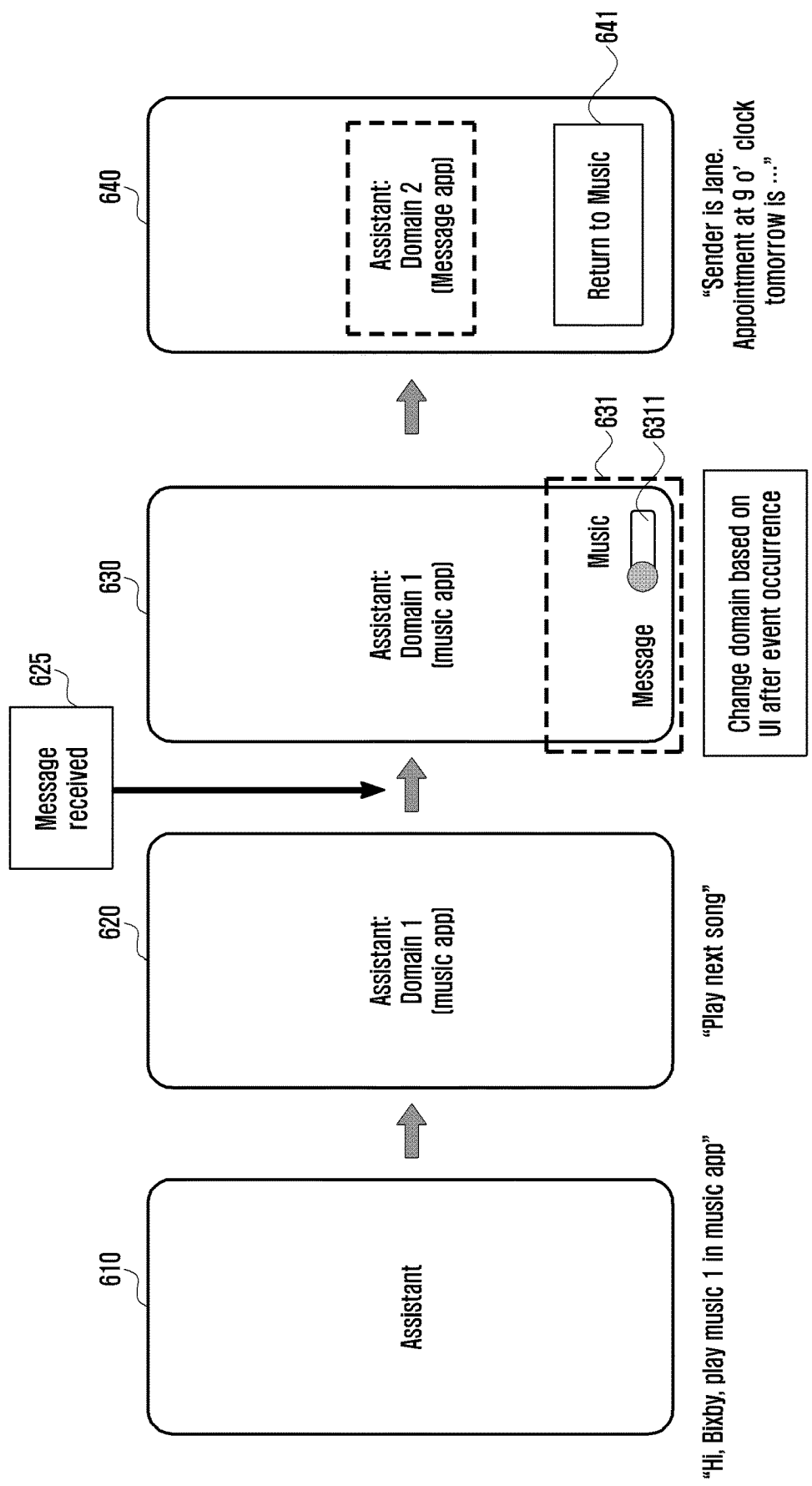
FIG. 6 illustrates a diagram of an exemplary operation of an electronic device according to an embodiment outputting a user interface for selecting an application in response to receiving an event.

FIG. 6 illustrates a diagram illustrating an exemplary operation of an electronic device according to an embodiment outputting a user interface for selecting an application in response to receiving an event.

Referring to FIG. 6, when an event has occurred, an electronic device according to an embodiment (for example, electronic device 101 in FIG. 2A) may determine an app (or domain) to process a user utterance related to the event based on a user input through a user interface 631.

According to an embodiment, on the screen 610, the electronic device 101 may execute an intelligence app (for example, BIXBY™ app 752 in FIG. 7) in response to receiving a wake-up utterance (for example, Hi Bixby! !) or receiving an input made by pressing a physical button, and may sense a user utterance by activating a speech recognition function after the intelligence app 752 is executed. For example, on the screen 610, if the electronic device 101 receives a user utterance such as "Hi Bixby, play music 1 in music app", the electronic device 101 may execute the music app (for example, first app 135_1 in FIG. 2A) and play music 1.

According to an embodiment, on the screen 620, the electronic device 101 may receive an additional user utterance while the music app 135_1 is executed, and if the corresponding user utterance is related to the music app 135_1, may process a function related to the user utterance through the music app 135_1. For example, on the screen 620, if the electronic device 101 receives a user utterance such as "Play the next song", the electronic device 101 may play the next song (for example, music 2) through the music app 135_1.

In operation 625, the electronic device 101 according to an embodiment may receive a designated event, for example a message, while the music app 135_1 is executed. For example, the designated event may be related to another app (for example, second app 135_2 in FIG. 2A) (for example, message app) that cannot be processed by the app (for example, music app 135_1) currently executed in the electronic device 101.

According to an embodiment, on the screen 630, the electronic device 101 may display a user interface 631 for replacing the currently executed app (for example, first app 135_1 or current domain) with another app (for example, second app 135_2 or another domain) related to the designated event, in response to receiving the designated event. For example, if an event is received, the electronic device 101 may determine a app (for example, second app 135_2 or another domain) capable of processing a task related to the event based on an artificial intelligent (AI) system (for example, event proactive module (EPM) 265 in FIG. 2A), and may display a user interface 631 that makes it possible to choose replacement with the determined app 135_2. For example, the user interface 631 may include an object 6311, as on the screen 630, that makes it possible to select the message app 135_2 or the music app 135_1.

According to an embodiment, on the screen 630, the electronic device 101 may sense a user utterance for a designated period of time, upon receiving a user input for choosing a change to another app (for example, second app 135_2 or another domain) through the user interface 631. For example, on the screen 630, the electronic device 101 may receive a user utterance such as "Read the message that just arrived". For example, the electronic device 101 may sense a user utterance for a designated period of time, for example, ten seconds, after receiving a user input through the user interface 631. According to an embodiment, on the screen 630, if no user utterance is sensed for the designated period of time, the electronic device 101 may maintain the execution screen of the app (for example, music app 135_1) before receiving the event. According to an embodiment, ten seconds, as the designated period of time, is only an example, and the same may be variously modified or configured.

According to an embodiment, on the screen 640, the electronic device 101 may execute another app (or second app 135_2) (for example, message app 135_2) capable of processing the designated event and the user utterance. The electronic device 101 according to an embodiment may perform a task corresponding to the user utterance and may output the result of performing the task, through the other app 135_2. For example, on the screen 640, the electronic device 101 according to an embodiment may output the content of the message received in operation 625 in a voice type, graphic type, or text type, such as "Sender is Jane, Appointment at 9 o'clock tomorrow is . . . ". According to an embodiment, on the screen 640, if a designated period of time passes after performing the task corresponding to the user utterance and outputting the result of performing the task, the electronic device 101 may return to the execution screen of the app (for example, music app 135_1) before receiving the event. According to an embodiment, on the screen 640, the electronic device 101 may display a user interface 641 for returning to the execution screen of the app (for example, music app 135_1) before receiving the event, and if a user input is sensed through the user interface 641, may display the execution screen of the previous app (for example, music app 135_1).

Figure 7:
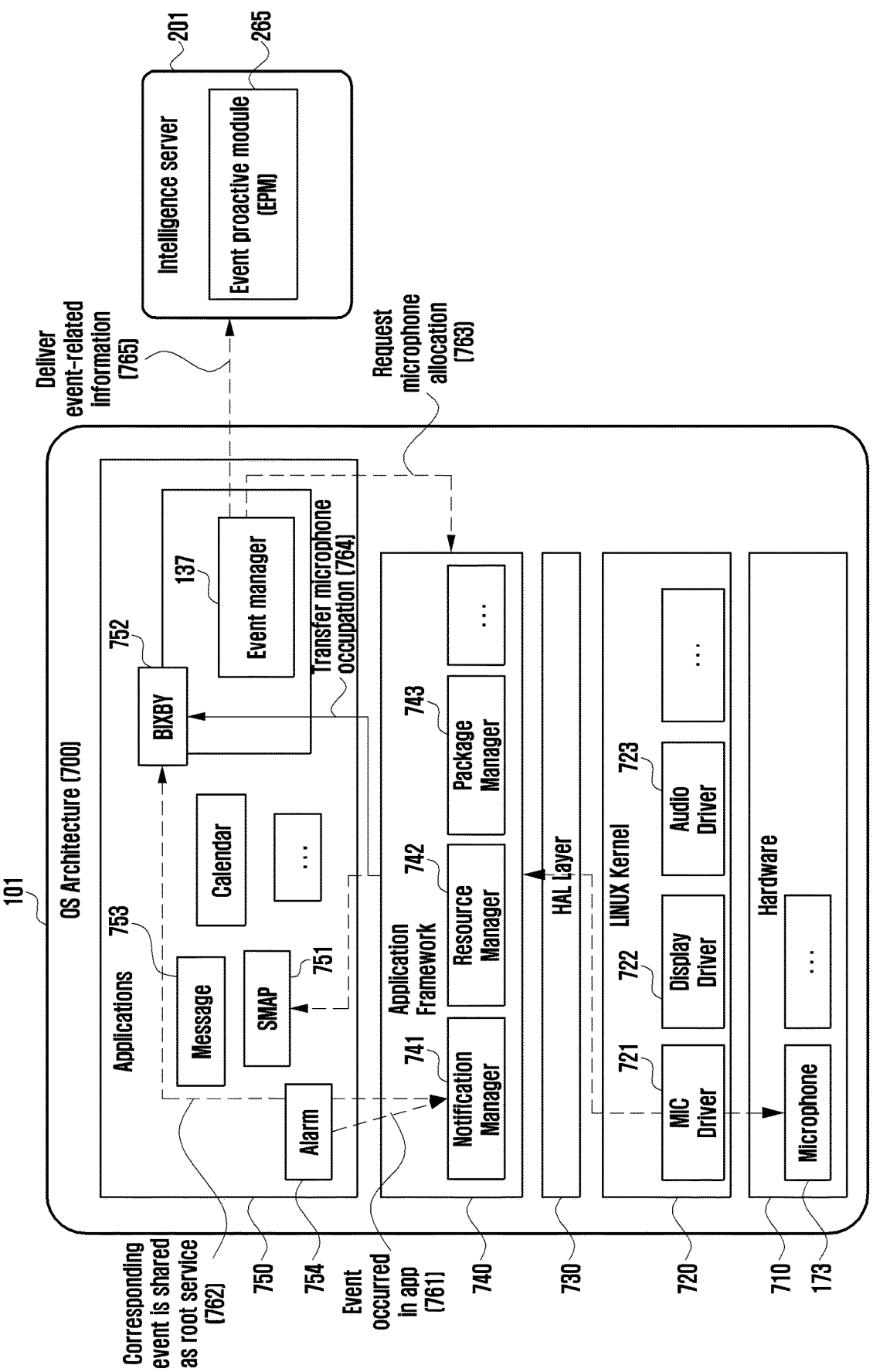
FIG. 7 illustrates a block diagram of an operating system architecture of an electronic device according to an embodiment.

FIG. 7 illustrates a block diagram of an operating system architecture of an electronic device according to an embodiment.

Referring to FIG. 7, the operating system architecture 700 of an electronic device 101 according to an embodiment may include hardware 710, a Linux kernel 720, a hardware abstraction layer (HAL) 730, an application framework 740, or multiple apps 750. The operating system architecture 700 of the electronic device 101 according to an embodiment may be, for example, ANDROID ARCHITECTURE.

According to an embodiment, the hardware 710 may include physical components constituting the electronic device 101. For example, the hardware 710 may include a microphone 173 (for example, 173 in FIG. 2A), a display (not illustrate) (for example, 160 in FIG. 2A), a speaker (not illustrated) (for example, 171 in FIG. 2A), or a camera module (not illustrated) (for example, 180 in FIG. 1).

According to an embodiment, the Linux kernel 720 may include a group of instructions necessary for controlling the hardware 710, that is, drivers 721, 722, and 723. For example, the Linux kernel 720 may include a microphone driver 721 for controlling the microphone 173, a display driver 722 for controlling the display 160, or an audio driver 723 for controlling the speaker 171.

According to an embodiment, the HAL 730 may be a logical code segmentation playing the role of an abstraction layer between the hardware 710 and software. The HAL 730 may include common instruction sets regarding the hardware 710, and may provide a device driver interface and a library module of the hardware 710 such that a program can communicate with the hardware.

According to an embodiment, the application framework 740 may be an aggregate that implements a standard structure of an application for the operating system in a class or library type. According to an embodiment, the application framework 740 may be JAVA™ API framework. According to an embodiment, the application framework 740 may include a notification manager 741, a resource manager 742, or a package manager 743.

According to an embodiment, the multiple apps 750 (for example, 135 in FIG. 2A) may be programs for performing designated functions. For example, each of the multiple apps 750 may include multiple actions for performing a designated function. For example, the multiple apps 750 may include at least one of a alarm app 754, a message app 753, or a map app 751. According to an embodiment, the multiple apps 750 may be executed by a processor (for example, 120 in FIG. 1 or FIG. 2A) so as to successively execute at least some of the multiple actions.

According to an embodiment, the multiple apps 750 may store multiple intelligence apps different from each other. According to an embodiment, the multiple apps may be intelligence apps based on speech recognition (for example, BIXBY™ app 752), and the electronic device 101 may preconfigure a default app (or root app) among the multiple intelligence apps based on a user input. For example, the electronic device 101 may have multiple intelligence apps installed therein, such as BIXBY™ app 752 or GOOGLE ASSISTANT™ app (not illustrated), and may configure the BIXBY™ app 752 as the default app based on a user input. According to an embodiment, the intelligence app 752 configured as the default app, for example, BIXBY™ app, may include an event manager (for example, 137 in FIG. 2A).

According to an embodiment, if a designated event occurs in the electronic device 101, the event manager 137 may identify the configuration value related to the currently executed app, and may determine, based on the configuration value, whether or not to perform a follow-up action related to the designated event. According to an embodiment, the event manager 137 may ignore the designated event based on the configuration value corresponding to the currently executed app, or may transmit information (or data) regarding the designated event to an artificial intelligent (AI) system. According to an embodiment, the AI system may be an intelligence server 201 including an event proactive module 265. According to an embodiment, the electronic device 101 may have an embedded AI system (for example, 810 in FIG. 8), and in this case, the electronic device 101 may transmit information (or data) related to the designated event to the proactive module (for example, 840 in FIG. 8) of the embedded AI system (for example, 810 in FIG. 8).

Hereinafter, operations of the electronic device 101 according to an embodiment will be described with reference to FIG. 7.

In operation 761, an event may occur in a specific app (for example, alarm app 754) among the multiple apps 750, and the electronic device 101 according to an embodiment may deliver the corresponding event occurrence information to the notification manager 741 of the application framework 740.

In operation 762, the electronic device 101 according to an embodiment may share (deliver) information regarding the event occurred in the specific app (for example, alarm app 754) with (to) the intelligence app 752 as a root service. For example, the electronic device 101 may store multiple intelligence apps (for example, as BIXBY™ app or GOOGLE ASSISTANT™ app), and a specific intelligence app (for example, as BIXBY™ app 752) among the multiple intelligence apps may be configured as a default app (or root service) by a user configuration. According to an embodiment, when an event has occurred in a specific app (for example, alarm app 754), the electronic device 101 may deliver event occurrence information to the intelligence app (for example, as BIXBY™ app 752) configured as the default app. For example, an alarm event that occurred in the alarm app 754 may be delivered to the BIXBY™ app 752 configured as the default app.

In operation 763, the electronic device 101 according to an embodiment may change the right to use the microphone 173 such that the intelligence app 752 (for example, BIXBY™) that received the event occurrence information performs a speech recognition function. For example, in response to receiving the event occurrence information, the intelligence app 752 may request the application framework 740 to allocate the right to use the microphone 173.

In operation 764, the electronic device 101 according to an embodiment may cause the application framework 740, which received a request for use of the microphone 173 from the intelligence ap 752, to assign a right to occupy the microphone 173 to the intelligence app 752. For example, if the right to occupy the microphone 173 has been held by an app (for example, map app 751) that has been executed before the event occurrence, the application framework 740 may transfer the right to occupy the microphone 173 from the map app 751 to the intelligence app 752. Accordingly, information regarding the user's utterance acquired through the microphone 173 may be delivered to the intelligence app 752.

In operation 765, the electronic device 101 according to an embodiment may determine whether or not the event manager 137 of the intelligence app 752 is supposed to perform a follow-up action related to the designated event, based on a configuration value (or value configured by default) entered by the user in advance. According to an embodiment, the event manager 137 may ignore the designated event based on a configuration value corresponding to the currently executed app (for example, map app 751), or may transmit information (or data) related to the designated event the event proactive module 265 of the intelligence server (for example, 201 in FIG. 2A). According to an embodiment, information transmitted to the intelligence server 201 by the intelligence app 752 of the electronic device 101 may include at least one of identification information of the app (for example, alarm app 754) in which the event occurred, the time at which the event occurred, or the type of the event.

According to an embodiment, upon acquiring a user utterance through the microphone 173, the electronic device 101 may transmit data corresponding to the acquired user utterance to the intelligence server 201.

According to an embodiment, the electronic device 101 may have an embedded artificial intelligent (AI) platform, and may incorporate at least some of elements embedded in the intelligence server 201, for example. In this case, the electronic device 101 may transmit information related to the occurred event to the AI platform (for example, 810 in FIG. 8) embedded in the electronic device 101, not to the intelligence server 201, and the AI platform 810 may include an event proactive module (for example, 840 in FIG. 8). An embodiment in which the electronic device 101 has an embedded AI platform will be described later in this document in more detail with reference to FIG. 8.

According to an embodiment, the event proactive module 265 of the intelligence server 201 may pre-analyze information received from the electronic device 101, and may determine the app (or domain) to process a user utterance received from the electronic device 101 after the event occurrence.

According to an embodiment, if a user utterance is received from electronic device 101 after the event proactive module 265 determined the app (or domain) to process the user utterance, the intelligence server 201 may determine a plan for performing a task corresponding to the voice input, and may transmit the determined plan to the electronic device 101. According to an embodiment, the electronic device 101 may have an embedded AI platform having identical or similar functions and elements as those of the intelligence server 201, and in this case, the AI platform embedded in the electronic device 101 may determine the app (or domain) to process the user utterance independently, and may determine a plan for performing a task corresponding to the received voice input.

Figure 8:
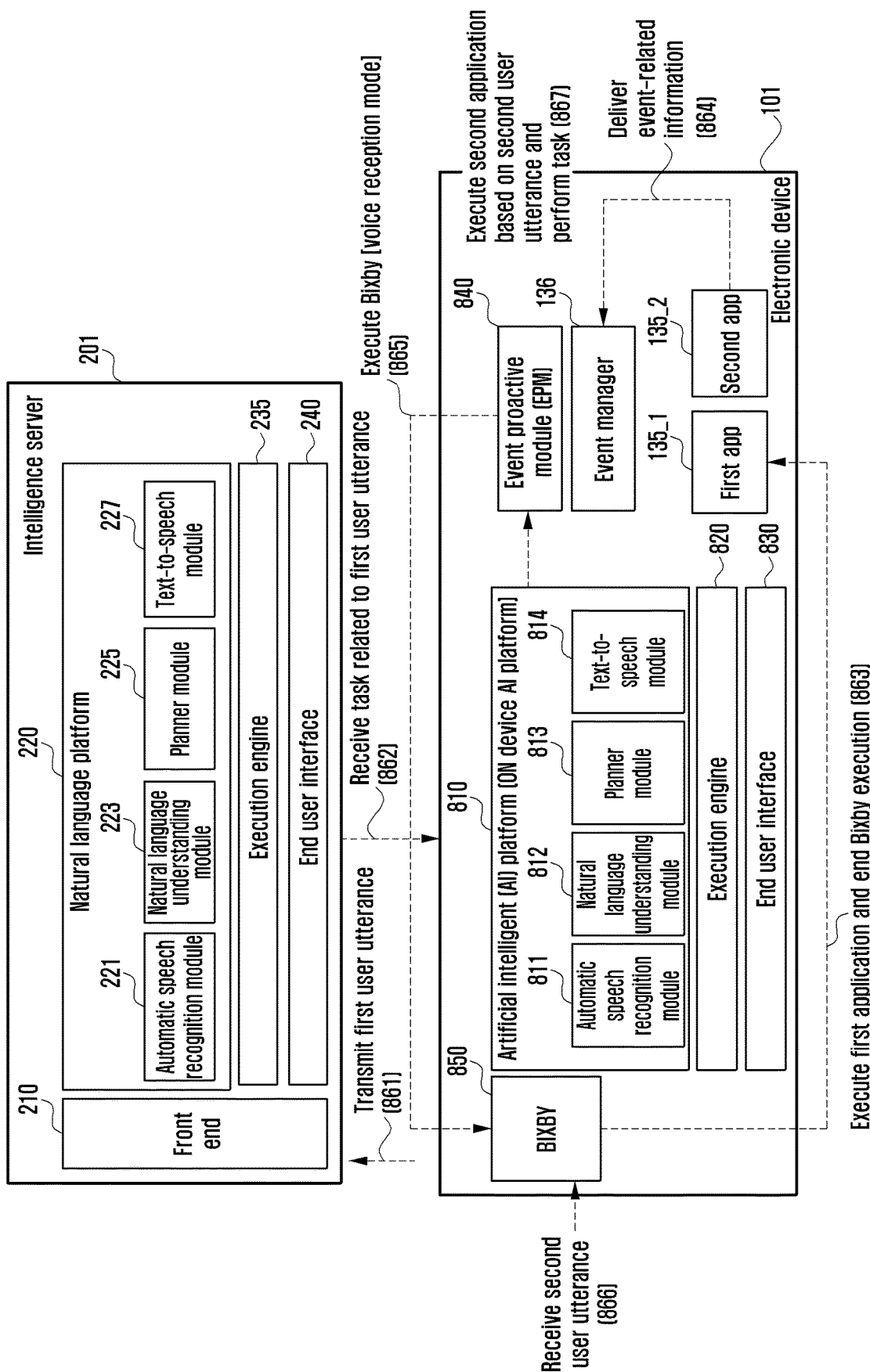
FIG. 8 illustrates a block diagram of an exemplary artificial intelligent (AI) platform embedded in an electronic device according to an embodiment.

FIG. 8 illustrates a block diagram of an exemplary AI platform embedded in an electronic device according to an embodiment.

Referring to FIG. 8, the intelligence server 201 according to an embodiment may include a front end 210, a natural language platform 220, an execution engine 235, or an end user interface 240. According to an embodiment, the natural language platform 220 may include an automatic speech recognition module 221, a natural language understanding module 223, a planner module 225, or a text-to-speech module 229. The intelligence server 201 illustrated in FIG. 8 may be substantially identical or similar to the intelligence server 201 illustrated in FIG. 2A. Therefore, identical descriptions of the elements embedded in the intelligence server 201 in FIG. 8 as those of the intelligence server 201 in FIG. 2A will be omitted herein.

According to an embodiment, the electronic device 101 may have an embedded AI platform 810. According to an embodiment, the electronic device 101 may include an AI platform 810, an execution engine 820, an end user interface 830, an event proactive module 840, at least one intelligence app 850 (for example, BIXBY™ app), an event manager (for example, 137 in FIG. 7), or multiple apps (for example, first app 135_1 or second app 135_2 in FIG. 2A). According to an embodiment, the AI platform 810 may include an automatic speech recognition module 811, a natural language understanding module 812, a planner module 813, or a text-to-speech module 814, and these elements may perform substantially identical functions as those of the elements 221, 223, 225, and 227 embedded in the intelligence server 201, respectively. According to an embodiment, the execution engine 820 or the end user interface 830 embedded in the electronic device 101 may perform the same function as that of the execution engine 235 or the end user interface 240 embedded in the intelligence server 201.

According to an embodiment, at least some of the event proactive module 840 or the event manager 137 may be embedded in the intelligence app 850.

Hereinafter, operations of the electronic device 101 according to an embodiment will be described with reference to FIG. 8.

In operation 861, the electronic device 101 according to an embodiment may execute an intelligence app 850 in response to receiving a wake-up utterance (for example, Hi Bixby!!) or receiving an input made by pressing a physical button, and may sense a user utterance by activating a speech recognition function after the intelligence app 850 is executed. According to an embodiment, as on the screen 510 in FIG. 5, the electronic device 101 may receive a first user utterance such as "Hi Bixby, play music 1 in music app", and may transmit data (or information) corresponding to the received first user utterance to the intelligence server 201.

In operations 862 and 863, the electronic device 101 according to an embodiment may receive a plan for performing a task related to the first user utterance from the intelligence server 201, and may execute a first app 135_1 (for example, music app) at least based on the received plan. According to an embodiment, the electronic device 101 may output the result of performing the task by using the first app 135_1, at least based on the received plan. For example, the electronic device 101 may execute the music app and may play "music 1" through the music app. According to an embodiment, the electronic device 101 may end execution of the intelligence ap 752 after performing all tasks related to the first user utterance.

In operation 864, the electronic device 101 according to an embodiment may receive a designated event related to a second app 135_2 (for example, message app) while displaying an execution screen of the first app 135_1, and the received event may be shared (delivered) with (to) the intelligence app 850 as a root service. According to an embodiment, the intelligence app 850 may transmit event-related information to the event manager 137. The event manager 137 according to an embodiment may identify a configuration value regarding the currently executed app (for example, first app 135_1) and may determine whether or not to perform a follow-up action related to the designated event based on the configuration value. According to an embodiment, the event manager 137 may deliver information regarding the event to the event proactive module 840 embedded in the electronic device 101, based on the user's configuration value related to the currently executed app (for example, first app 135_1).

In operation 865, the electronic device 101 according to an embodiment may cause the event proactive module 840 to pre-analyze information related to the event received from the event manager 137 and to determine the app (or domain) to process a user utterance received from the electronic device 101 after the event occurrence. According to an embodiment, the event proactive module 840 may execute the intelligence app 850 based on the result of pre-analyzing the event-related information, and may assign the right to occupy the microphone (for example, 173 in FIG. 7) of the electronic device 101 to the intelligence app 850.

In operation 866, the electronic device 101 according to an embodiment may cause the the intelligence app 850 that acquired the right to occupy the microphone (for example, 173 in FIG. 7) to receive a second user utterance and to deliver the received second user utterance to the AI platform 810. According to an embodiment, as on the screen 530 in FIG. 5, the electronic device 101 may receive a second user utterance such as "Read the message that just arrived", and may deliver data (or information) corresponding to the received second user utterance to the AI platform 810.

In operation 867, the electronic device 101 according to an embodiment may cause the AI platform 810 to determine a plan to perform a task corresponding to the second user utterance. The electronic device 101 according to an embodiment may execute the second app 135_2 based on the determined plan, and may output the result of performing the task by using the second app 135_2. According to an embodiment, the electronic device 101 may display the result of performing the task corresponding to the second user utterance on the display (for example, display device 160 in FIG. 1) or output a voice message through the speaker (for example, 171 in FIG. 2A). According to an embodiment, as on the screen 540 in FIG. 5, the electronic device 101 may output the content of the message in a voice type, graphic type, or text type, such as "Sender is Jane, Appointment at 9 o'clock tomorrow is . . . ".

According to an embodiment, the electronic device 101 may end execution of the intelligence app 850 after performing all tasks related to the second user utterance, and may return to the state before receiving the event related to the second app 135_2. For example, the electronic device 101 may switch the first app 135_1 from the background state to the foreground state, and may display the execution screen of the first app 135_1 on the display 160.

Figure 9:
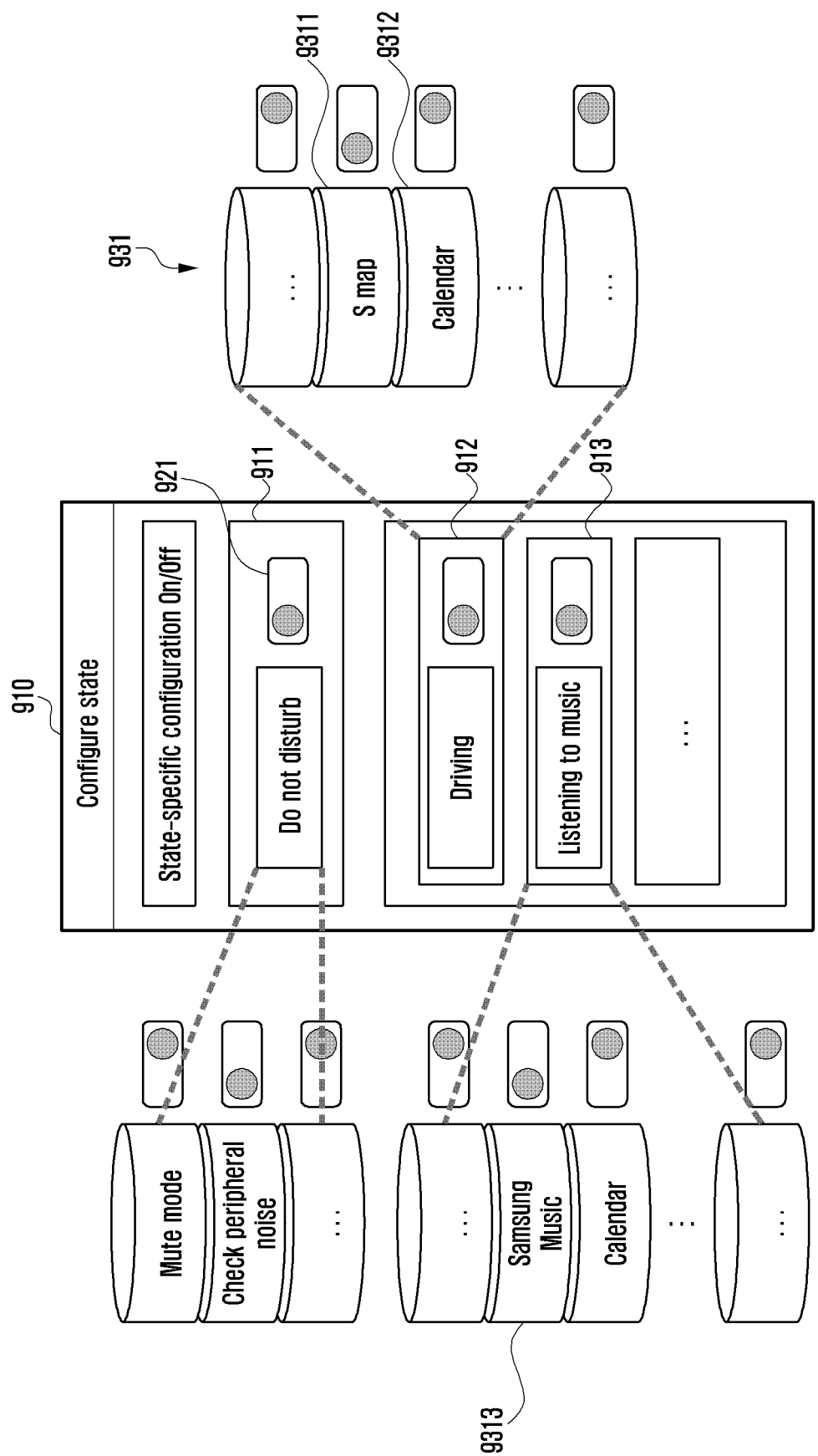
FIG. 9 illustrates a diagram of an exemplary screen used by an electronic device according to an embodiment to configure whether or not to perform an AI action based on speech recognition related to an event.

FIG. 9 illustrates a diagram of an exemplary configuration screen 910 used by an electronic device according to an embodiment to configure whether or not to perform an AI action based on speech recognition related to an event.

Referring to FIG. 9, when an event has occurred, the electronic device according to an embodiment (for example, electronic device 101 in FIG. 2A) may provide a configuration screen 910 (for example, user interface) for configuring whether or not to perform an AI action based on speech recognition related to an event. According to an embodiment, the configuration screen 910 may include multiple state menus 911, 912, and 923 indicating the user's state. For example, the multiple state menus 911, 912, and 923 may include the user's states that the user can preconfigure, such as "Do not disturb" 911, driving 912, or listening to music 913. According to an embodiment, the multiple state menus 911, 912, and 923 may include a quick configuration icon 921 for making an on/off configuration regarding whether or not to perform an AI action based on speech recognition. According to an embodiment, the quick configuration icon 921 may be used to quickly configure whether or not to perform an AI action based on speech recognition preconfigured by the user with regard to the corresponding state menu (for example, driving 912). For example, the multiple state menus 911, 912, and 923 may include a sub menu 931 making it possible to configure whether or not to perform an AI action based on speech recognition with regard to each of multiple apps (for example, first app 135_1 or second app 135_2 in FIG. 2A) stored in the electronic device 101. The user may select at least some of multiple apps 9311, 9312, and 9313 (for example, first app 135_1 or second app 135_2 in FIG. 2A) through the sub menu 931, and may input a choice regarding whether or not to perform an AI action based on speech recognition. For example, in the case of driving 912 among the multiple state menus 911, 912, and 913, the user may make a configuration so as to perform an AI action based on speech recognition related to an event with regard to the map app 9311 among the multiple apps 9311, 9312, and 9313 installed in the electronic device 101, and so as not to perform an AI action based on speech recognition related to an event with regard to the calendar app 9312. In this case, if an event related to another app (for example, music app 9313) has occurred while executing the map app 9311, the electronic device 101 may provide an AI service based on speech recognition through the intelligence app 752 which is a root service. On the other hand, if an event related to another app (for example, music app 9313) has occurred while executing the calendar app 9312 configured to be deactivated on the configuration screen, the electronic device 101 may not perform an AI action based on speech recognition.

According to an embodiment, if an event has occurred based on a user input through a configuration screen 910 as illustrated in FIG. 9, the event manager (for example, event manager 137 in FIG. 2A) of the electronic device (for example, electronic device 101 in FIG. 2A) may determine whether or not to perform an AI action based on speech recognition.

A method for performing an action using a speech recognition function by an electronic device (for example, 101 in FIG. 1) according to an embodiment may include the operations of: receiving a designated event related to a second application (for example, 135_2 in FIG. 2A) while an execution screen of a first application (for example, 135_1 in FIG. 2A) is displayed on a display (for example, 160 in FIG. 1); executing an artificial intelligent application (for example, 752 in FIG. 7) in response to the designated event; transmitting data related to the designated event to an external server (for example, 201 in FIG. 2A) through a communication circuit (for example, communication module 190 in FIG. 1), based on the executed artificial intelligent application 752; sensing a user utterance related to the designated event for a designated period of time through a microphone (for example, 173 in FIG. 2A); transmitting the user utterance, if the user utterance is sensed, to the intelligence server 201 through the communication module 190; receiving an action order for performing a function related to the user utterance from the intelligence server 201 through the communication module 190; executing the second application 135_2 at least based on the received action order; and outputting a result of performing the function by using the second application 135_2. The method may further include the operations of: activating a microphone 173 if the artificial intelligent application 752 is executed in response to the designated event; and delivering information acquired through the activated microphone 173 to the artificial intelligent application 752. The method may further include the operations of: displaying a user interface of selecting an application for the designated period of time on the display 160, in response to receiving the designated event; and starting sensing the user utterance if a user input of selecting the second application 135_2 is received through the user interface. The method may further include the operations of: executing the artificial intelligent application 752 in response to receiving the designated event related to the second application 135_2 while the display 160 is deactivated; transmitting the data related to the designated event to the intelligence server 201 through the communication module 190, based on the executed artificial intelligent application 752; sensing the user utterance related to the designated event for the designated period of time through the microphone 173; transmitting the user utterance, if the user utterance is sensed, to the intelligence server 201 through the communication module 190; receiving the action order for performing the function related to the user utterance from the intelligence server 201 through the communication module 190; executing the second application 135_2 at least based on the received action order; and outputting a result of performing the function by using the second application 135_2.

A method for performing an action using a speech recognition function by an electronic device 101 according to an embodiment may include the operations of: receiving a designated event related to a second application 135_2 while an execution screen of a first application 135_1 is displayed on a display 160; executing an artificial intelligent application 752 in response to the designated event; pre-analyzing data related to the designated event, based on the executed artificial intelligent application 752; sensing a user utterance related to the designated event for a designated period of time through a microphone 173; determining an action order for performing a function related to the user utterance, based on a result of pre-analyzing the data, if the user utterance is sensed; executing the second application 135_2 at least based on the determined action order; and outputting a result of performing the function by using the second application 135_2. The method may further include the operations of: activating the microphone 173 if the artificial intelligent application 752 is executed in response to the designated event; and delivering the user utterance acquired through the activated microphone 173 to the artificial intelligent application 752. The method may further include the operations of: displaying a user interface of selecting an application for the designated period of time on the display 160, in response to receiving the designated event; and starting sensing the user utterance if a user input of selecting the second application 135_2 is received through the user interface.

Figure 10:
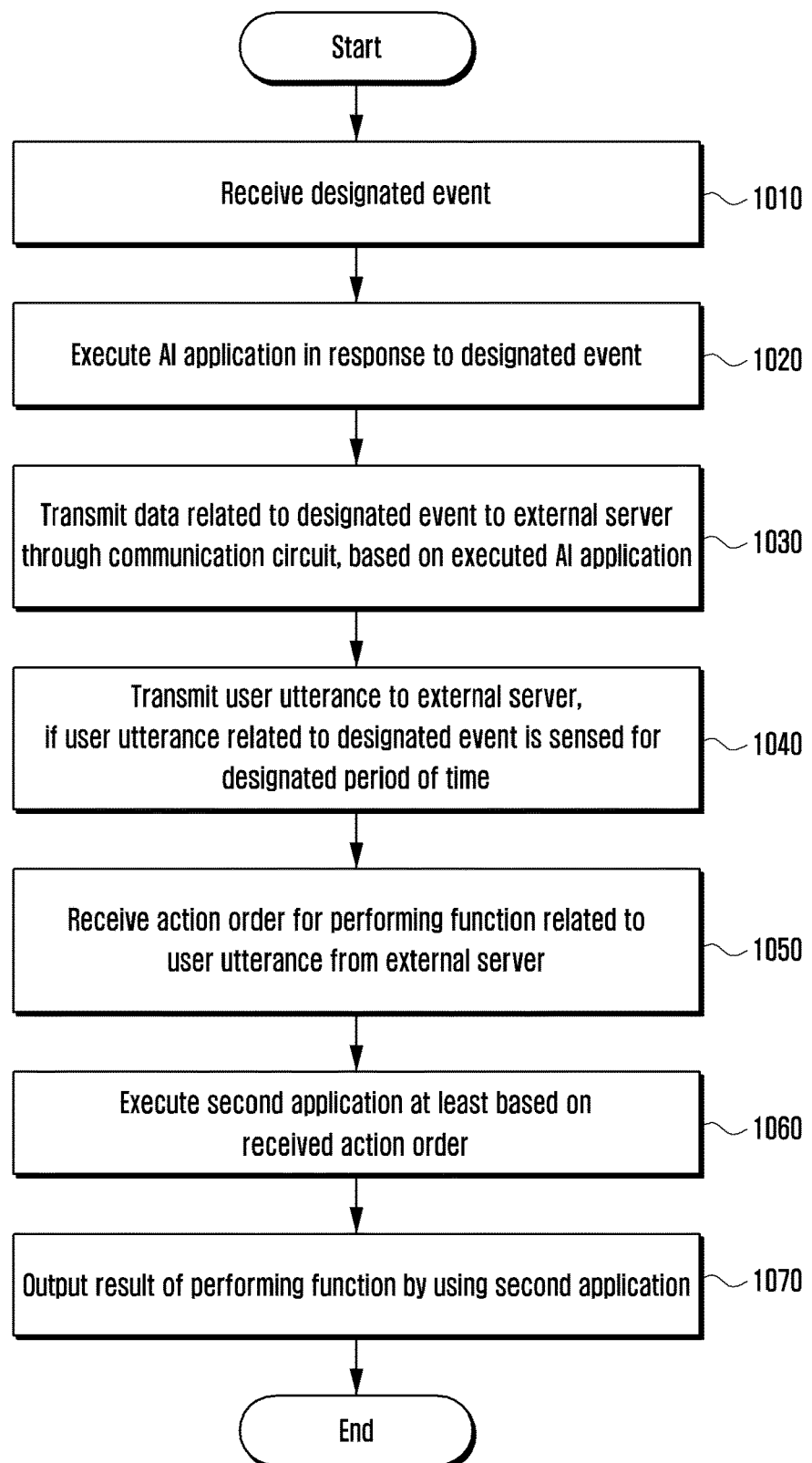
FIG. 10 illustrates a flowchart for describing operations of an electronic device according to an embodiment.

FIG. 10 illustrates a flowchart for describing operations of an electronic device according to an embodiment.

In operation 1010, the electronic device according to an embodiment (for example, electronic device 101 in FIG. 2A) may receive a designated event related to a second app (for example, second app 135_2 in FIG. 2A) while displaying an execution screen of a first app (for example, first app 135_1 in FIG. 2A). For example, a message reception event may occur while the electronic device 101 displays a music app execution screen.

In operation 1020, the electronic device 101 according to an embodiment may execute an AI app (hereinafter, referred to as intelligence app 752) in response to the designated event. According to an embodiment, the electronic device 101 may execute an intelligence app 752 (for example, BIXBY™ app) designated as a default app among multiple intelligence apps (for example, BIXBY™ app, GOOGLE ASSISTANT™ app) based on occurrence of a designated event.

In operation 1030, the electronic device 101 according to an embodiment may transmit data related to the designated event to an external server, for example an intelligence server (for example, intelligence server 201 in FIG. 2A) through a communication circuit (for example, communication module 190 in FIG. 1), based on the executed intelligence app 752. According to an embodiment, the electronic device 101 may cause the event manager (for example, event manager 137 in FIG. 7) of the intelligence app 752 to determine whether or not to perform a follow-up action related to the designated event, based on a configuration value (or value configured by default) pre-entered by the user. According to an embodiment, the event manager 137 may ignore the designated event based on a configuration value corresponding to the currently executed app (for example, map app 751 in FIG. 7), or may transmit information (or data) related to the designated event to the event proactive module (for example, 265 in FIG. 2A) of the intelligence server (for example, 201 in FIG. 2A). For example, if a message reception event has occurred while a music app execution screen is displayed, the electronic device 101 may identify the user configuration related to the music app, and may transmit information related to the music reception event to the event proactive module 265 of the intelligence server (for example, 201 in FIG. 2A) based on the user configuration.

According to an embodiment, information transmitted to the intelligence server 201 by the intelligence app 752 of the electronic device 101 may include at least one of identification information of the app (for example, alarm app 754) in which the event occurred, the time at which the event occurred, or the type of the event.

According to an embodiment, the event proactive module 265 of the intelligence server 201 may pre-analyze information received from the electronic device 101, and may determine the app (or domain) to process a user utterance received from the electronic device 101 after the event occurrence.

In operation 1040, the electronic device 101 according to an embodiment may sense a user utterance related to the designated event for a designated period of time, and if the user utterance is sensed, may transmit the user utterance to an external server (for example intelligence server 201) through the communication circuit (for example, communication module 190 in FIG. 1). According to an embodiment, the electronic device 101 according to an embodiment may cause the intelligence app 752 (for example, BIXBY™) that received the event occurrence information to change the right to use the microphone 173 in order to perform a speech recognition function. For example, in response to receiving the event occurrence information, the intelligence app 752 may request the application framework (for example, 740 in FIG. 7) to allocate the right to use the microphone (for example, 173 in FIG. 7). According to an embodiment, upon acquiring a user utterance through the microphone 173, the electronic device 101 may transmit data corresponding to the acquired user utterance to the intelligence server 201.

In operation 1050, the electronic device 101 according to an embodiment may receive a plan (for example, action order) for performing a task (for example, function) related to the user utterance from the external server (for example, intelligence server) through the communication circuit (for example, communication module 190 in FIG. 1). According to an embodiment, if a user utterance is received from the electronic device 101 after the event proactive module 265 has determined the app (or domain) to process a user utterance, the intelligence server 201 may determine a plan (for example, action order) for performing a task (for example, function) corresponding to the voice input, and may transmit the determined plan (for example, action order) to the electronic device 101. For example, as on the screen 530 in FIG. 5, the electronic device 101 may receive a user utterance such as "Read the message that just arrived", and may deliver data (or information) corresponding to the received user utterance to the intelligence server 201.

In operations 1060 and 1070, the electronic device 101 according to an embodiment may execute the second app 135_2 at least based on the received plan (for example, action order), and may output the result of performing the task (for example, function) by using the second app 135_2. According to an embodiment, the electronic device 101 may display the result of performing a task (for example function) corresponding to the second user utterance on the display (for example, display device 160 in FIG. 1) or may output a voice message through the speaker (for example, 171 in FIG. 2A). For example, as on the screen 540 in FIG. 5, the electronic device 101 may output the content of the message in a voice type, graphic type, or text type, such as "Sender is Jane, Appointment at 9 o'clock tomorrow is . . . ".

Figure 11:
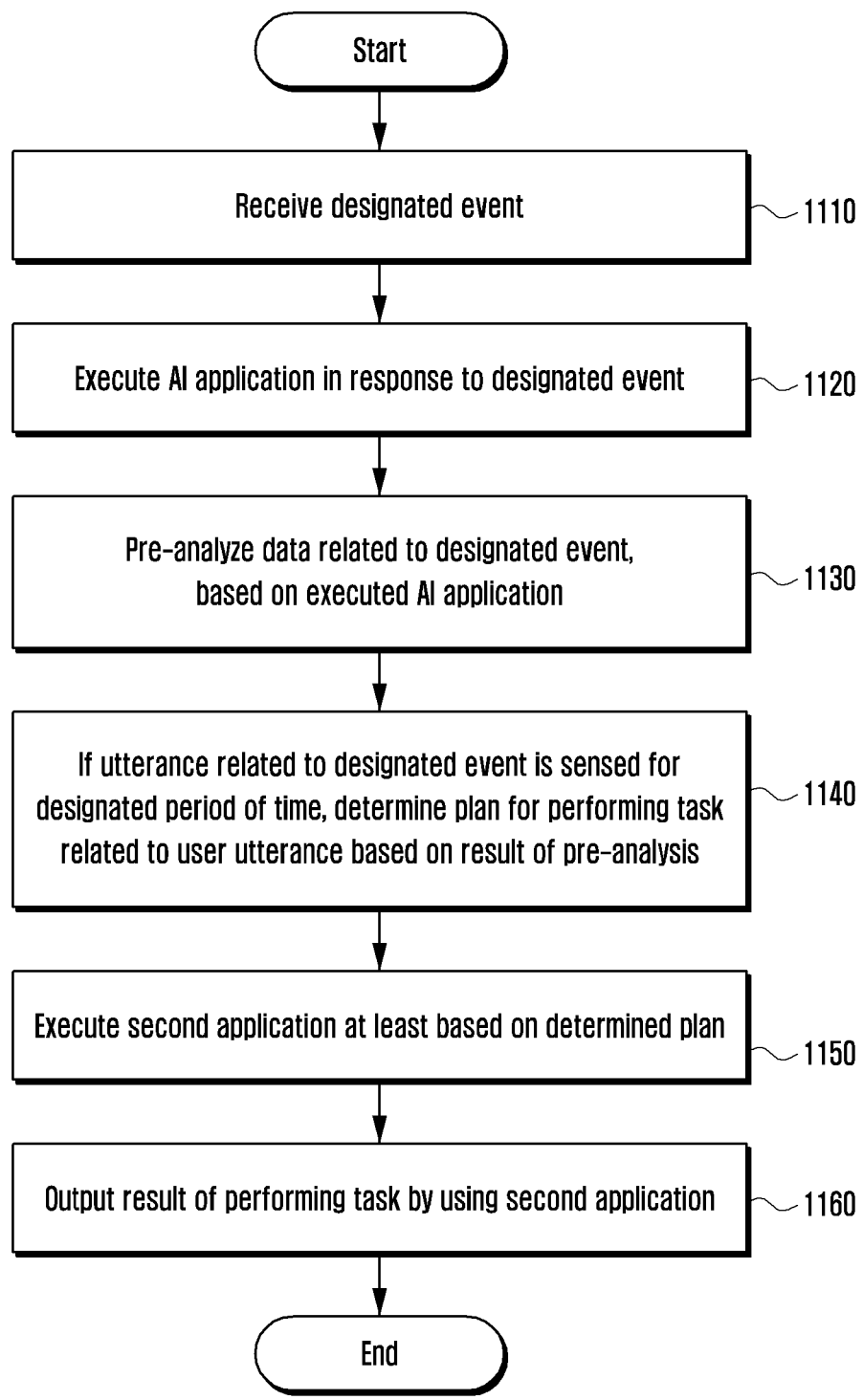
FIG. 11 illustrates a flowchart for describing operations of an electronic device according to an embodiment, which has an embedded AI platform.

FIG. 11 illustrates a flowchart for describing operations of an electronic device according to an embodiment, which has an embedded artificial intelligent (AI) platform.

In operation 1110, the electronic device according to an embodiment (for example, electronic device 101 in FIG. 2A) may receive a designated event related to a second app (for example, second app 135_2 in FIG. 2A) while displaying an execution screen of a first app (for example, first app 135_1 in FIG. 2A). For example, a message reception event may occur while the electronic device 101 displays a music app execution screen.

In operation 1120, the electronic device 101 according to an embodiment may execute an AI app (for example, intelligence app 752 in FIG. 7) in response to the designated event. According to an embodiment, the electronic device 101 may execute an intelligence app 752 (for example, BIXBY™ app) designated as a default app among multiple intelligence apps (for example, BIXBY™ app, GOOGLE ASSISTANT™ app) based on occurrence of an event.

In operation 1130, the electronic device 101 according to an embodiment may pre-analyze data related to the designated event based on the executed intelligence app 752. According to an embodiment, the event manager 137 of the electronic device 101 may ignore the designated event based on a configuration value corresponding to the currently executed app (for example, map app 751 in FIG. 7), or may transmit information (or data) related to the designated event to the event proactive module (for example, 840 in FIG. 8) embedded in the electronic device 101. According to an embodiment, the event proactive module 840 embedded in the electronic device 101 may pre-analyze information related to the received event, and may determine the app (or domain) to process a user utterance received by the electronic device 101 after event occurrence.

In operation 1140, the electronic device 101 according to an embodiment may sense a user utterance related to the designated event for a designated period of time and if the user utterance is sensed, may determine a plan (for example, action order) for performing a task (for example, function) related to the user utterance, based on the result of pre-analysis. According to an embodiment, the electronic device 101 may execute the intelligence app 752 and may assign a right to occupy the microphone (for example, 173 in FIG. 7) of the electronic device 101 to the intelligence app 752. According to an embodiment, the electronic device 101 may cause the the intelligence app 752 that acquired the right to occupy the microphone (for example, 173 in FIG. 7) to receive a user utterance and to deliver the received user utterance to the AI platform (for example, 810 in FIG. 8) embedded in the electronic device 101. According to an embodiment, the AI platform 810 may determine a plan (for example, action order) for performing a task (for example, function) corresponding to the second user utterance.

In operations 1150 and 1160, the electronic device 101 according to an embodiment may execute the second app 135_2 at least based on the determined plan (for example, order of actions), and may output the result of performing the task (for example, function) by using the second app 135_2.

Figure 12:
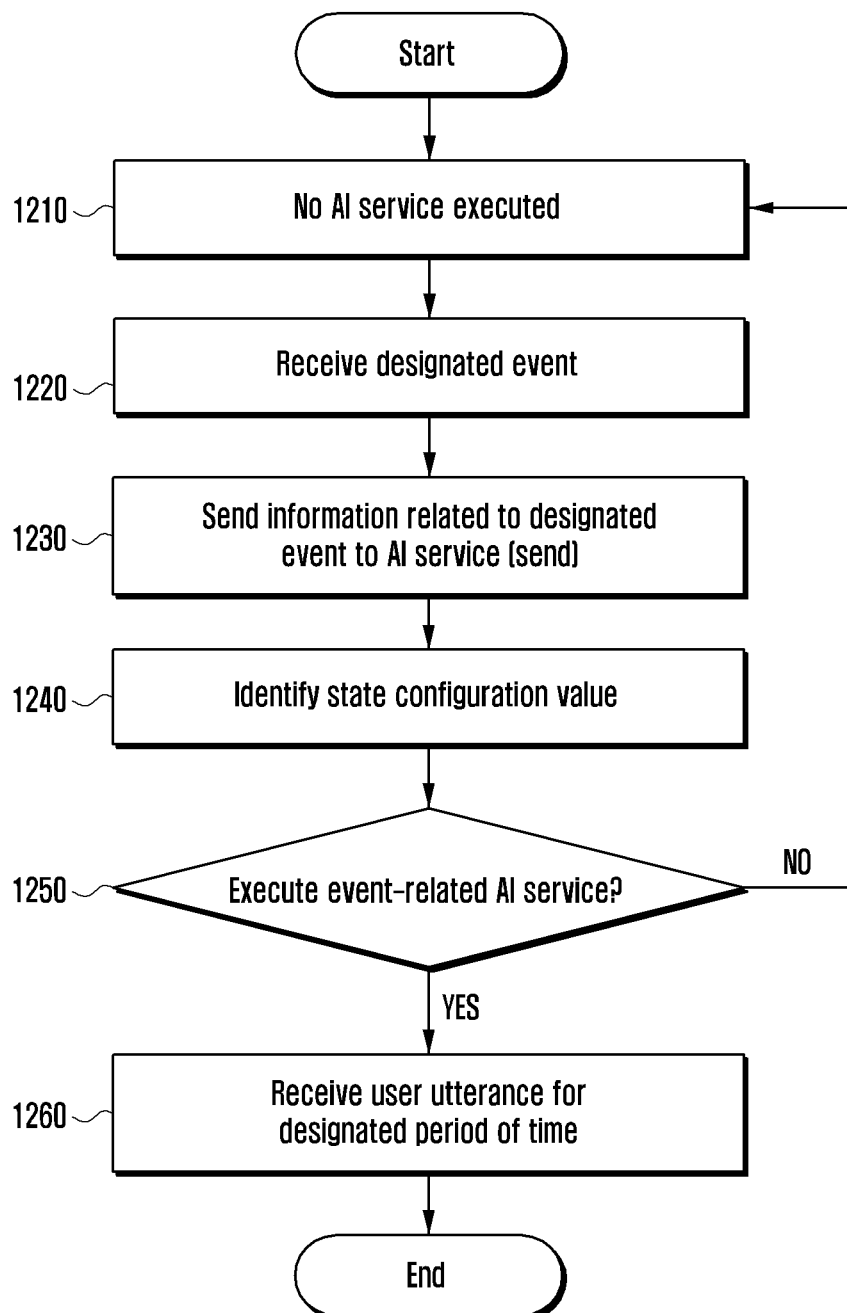
FIG. 12 illustrates a flowchart for describing operations of an electronic device according to an embodiment processing a received event while no intelligence app is executed.

FIG. 12 illustrates a flowchart for describing operations of an electronic device according to an embodiment processing a received event while no intelligence app is executed.

In operations 1210 and 1220, the electronic device 101 according to an embodiment may receive a designated event while no AI service (for example, intelligence app 752 in FIG. 7) (for example, BIXBY™ app) is executed. For example, a message reception event may occur while the electronic device 101 executes no intelligence app 752.

In operation 1230, the electronic device 101 according to an embodiment may execute an AI service (for example, intelligence app 752) in response to a designated event, and may deliver information related to the designated event to the AI service (for example, intelligence app 752).

In operation 1240, the electronic device 101 according to an embodiment cause the AI service (for example, intelligence app 752) to identify the state configuration value regarding the current app. According to an embodiment, the electronic device 101 may identify the user's configuration state instead of the state configuration value of the current app. For example, the AI service (for example, intelligence app 752) of the electronic device 101 may identify the user's states that the user can preconfigure, such as "Do not disturb", driving, or listening to music.

In operation 1250, the electronic device 101 according to an embodiment may determine whether or not to execute an AI service related to the designated event, based on a configuration value corresponding to the currently executed app (for example, map app 751). According to an embodiment, the electronic device 101 may identify the user's configuration state instead of the state configuration value of the current app. For example, the AI service (for example, intelligence app 752) may identify the user's states that the user can preconfigure, such as "Do not disturb", driving, or listening to music, and may determine whether or not to execute an AI action related to the designated event, based on the user state.

In operation 1260, the electronic device 101 according to an embodiment may receive a user utterance for a designated period of time, if it is determined to perform the AI service related to the designated event (for example, result of operation 1250 is "Yes"). For example, the electronic device 101 may sense a user utterance related to the designated event for a designated period of time, for example, ten seconds. The electronic device 101 according to an embodiment may proceed to operation 1210 if it is determined not to perform the AI service related to the designated event (for example, result of operation 1250 is "No").

Figure 13:
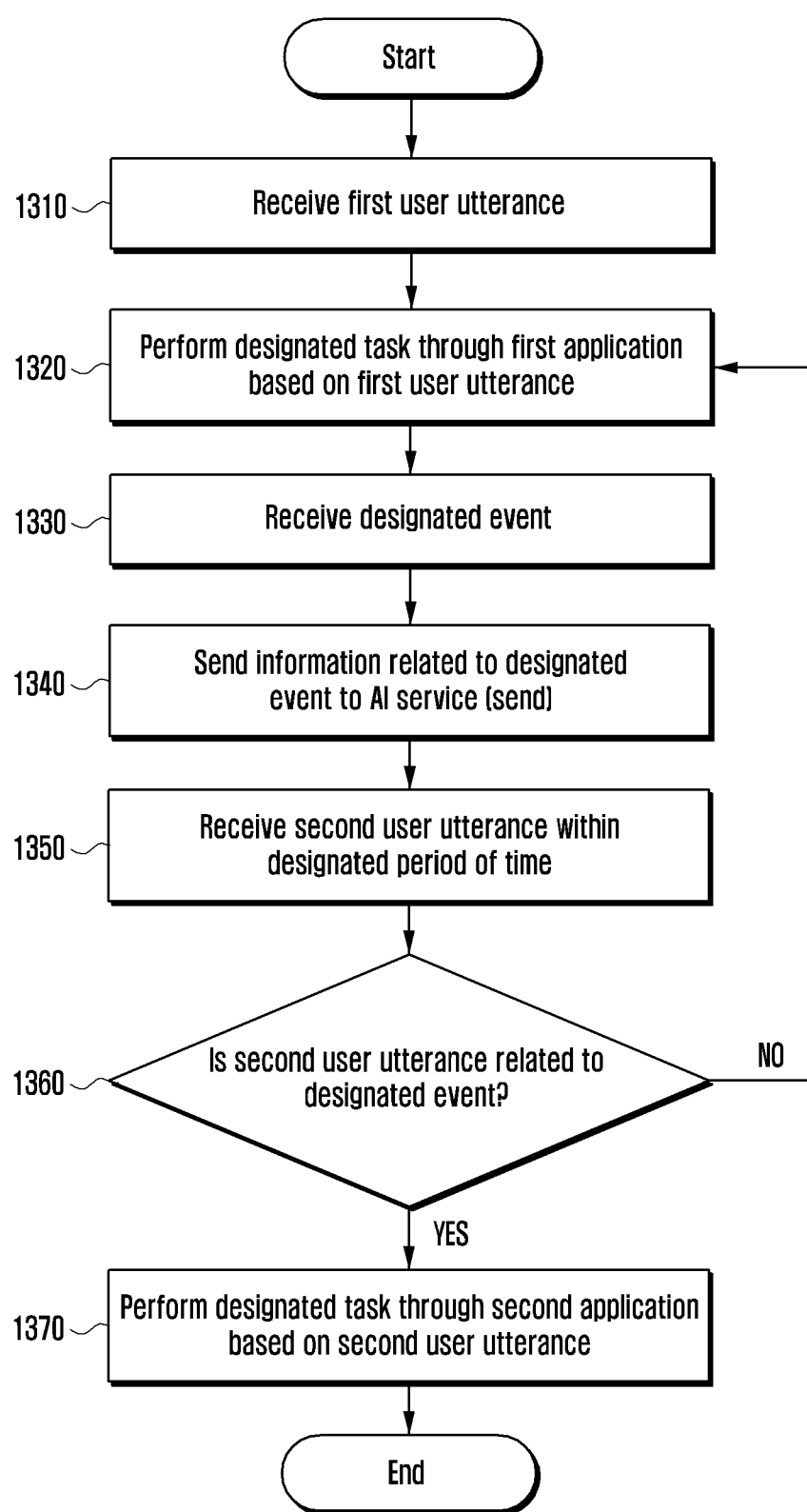
FIG. 13 illustrates a flowchart for describing operations of an electronic device according to an embodiment processing a received event while an intelligence app is executed.

FIG. 13 illustrates a flowchart for describing operations of an electronic device 101 according to an embodiment processing a received event while an intelligence app 752 is executed.

In operation 1310, the electronic device according to an embodiment (for example, electronic device 101 in FIG. 2A) may execute an intelligence app (for example, 752 in FIG. 7) in response to receiving a wake-up utterance (for example, Hi Bixby!!) or receiving an input made by pressing a physical button, and may receive a first user utterance by activating a speech recognition function after the intelligence app 752 is executed.

In operation 1320, the electronic device 101 according to an embodiment may receive a plan (for example, action order) for performing a task (for example, function) related to the first user utterance from the intelligence server (for example, intelligence server 201 in FIG. 2A), and may execute a first app (for example, 135_1 in FIG. 2A) (for example, music app) at least based on the received plan (for example, action order). According to an embodiment, the electronic device 101 may output the result of performing the task (for example, function) by using the first app 135_1, at least based on the received plan (for example, operation order).

In operations 1330 and 1340, the electronic device 101 according to an embodiment may receive a designated event related to a second app (for example, 135_2 in FIG. 2A) (for example, message app) while displaying an execution screen of the first app 135_1, and the received event may be shared (delivered) with (to) the intelligence app 752 as a root service. According to an embodiment, the intelligence app 752 may transmit event-related information to the event manager (for example, 137 in FIG. 7). The event manager 137 according to an embodiment may identify a configuration value regarding the currently executed app (for example, first app 135_1) and may determine whether or not to perform a follow-up action related to the designated event, based on the configuration value. According to an embodiment, the event manager 137 may deliver information related to the event to the event proactive module (for example, 840 in FIG. 8) embedded in the electronic device 101, based on the user's configuration value regarding the currently executed app (for example, first app 135_1).

In operation 1350, the electronic device 101 according to an embodiment may receive a second user utterance within a designated period of time. For example, the electronic device 101 may sense a user utterance for a designated period of time, for example ten seconds, after occurrence of the message reception event. According to an embodiment, if no user utterance is sensed for the designated period of time after receiving the designated event, the electronic device 101 may maintain the app execution screen before receiving the event. According to an embodiment, ten seconds, as the designated period of time, is only an example, and may be variously modified or configured. According to an embodiment, the electronic device 101 may deliver the user's utterance information acquired through the microphone 173 to the intelligence server 201. According to an embodiment, the electronic device 101 may deliver the user's utterance information acquired through the microphone 173 to the AI platform (for example, 810 in FIG. 8) embedded in the electronic device 101.

In operation 1360, the electronic device 101 according to an embodiment (or intelligence server) may confirm whether or not the second user utterance is related to the designated event.

In operation 1370, when the electronic device 101 (or intelligence server 201) has determined that the second user utterance is related to the designated event (for example, result of operation 1360 is "Yes"), the electronic device 101 according to an embodiment may determine a plan (for example, action order) for performing a task (for example, function) corresponding to the second user utterance, may execute a second app 135_2 based on the determined plan (for example, action order), and may output the result of performing the task (for example, function) by using the second app 135_2.

According to an embodiment, when the electronic device 101 (or intelligence server 201) has determined that the second user utterance is not related to the designated event (for example, result of operation 1360 is "No"), the electronic device 101 may proceed to operation 1320 and display the execution screen of the first app 135_1.

Figure 14:
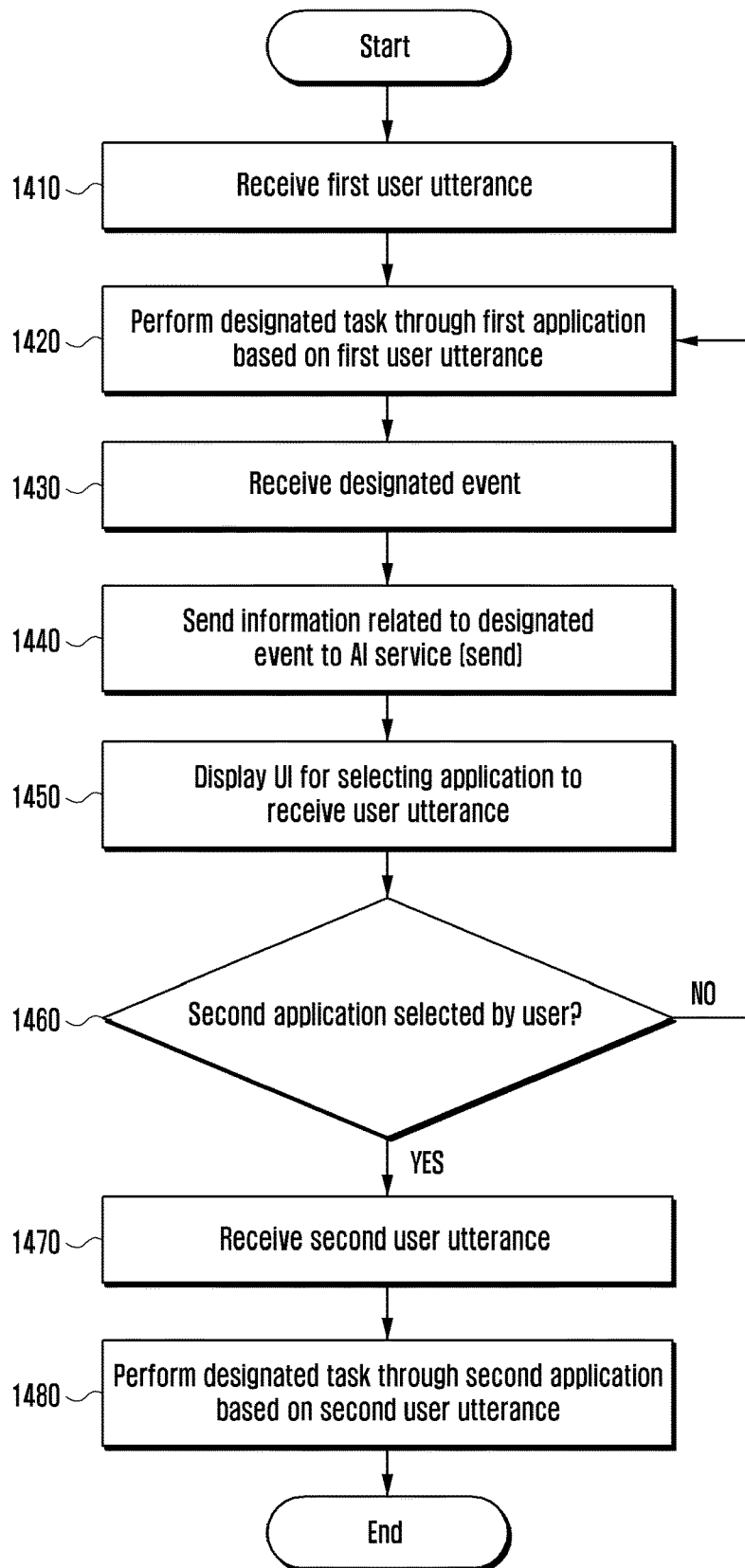
FIG. 14 illustrates a flowchart for describing operations of an electronic device according to an embodiment performing a speech recognition function based on a user interface for selecting an application.

FIG. 14 illustrates a flowchart for describing operations of an electronic device according to an embodiment performing a speech recognition function based on a user interface for selecting an application.

According to an embodiment, operations 1410 to 1440 illustrated in FIG. 14 may be identical or similar to operations 1310 to 1340 illustrated in FIG. 13. Accordingly, descriptions of operations 1410 to 1440 illustrated in FIG. 14, which overlap the descriptions of operations 1310 to 1340 illustrated in FIG. 13, will be omitted herein.

In operation 1450, the electronic device 101 according to an embodiment may display a user interface (for example, 631 in FIG. 6) for selecting an app. For example, as on the screen 630 in FIG. 6, the electronic device 101 may display, in response to receiving a designated event, a user interface 631 for replacing the currently executed app (for example, first app 135_1 or current domain) with another app (for example, second app 135_2 or another domain) related to the designated event.

In operation 1460, the electronic device 101 according to an embodiment may confirm whether or not the user selects the second app 135_2.

In operation 1470, the electronic device 101 according to an embodiment may sense a second user utterance for a designated period of time, if a user input of selecting the second app 135_2 is received (for example, result of operation 1460 is "Yes"). For example, on the screen 630 in FIG. 6, if the electronic device 101 receives a user input of selecting a change to another app (for example, second app 135_2 or another domain) through the user interface 631, the electronic device 101 may sense a second user utterance for a designated period of time.

If no user input of selecting the second app 135_2 is received (for example, result of operation 1460 is "No'), the electronic device 101 according to an embodiment may proceed to operation 1420 and display an execution screen of the first app 135_1.

In operation 1480, the electronic device 101 according to an embodiment may determine a plan (for example, action order) for performing a task (for example, function) corresponding to the second user utterance, may execute the second app 135_2 based on the determined plan (for example, action order), and may output the result of performing the task (for example, function) by using the second app 135_2. According to an embodiment, the electronic device 101 may receive a plan (for example, action order) for performing a task (for example, function) corresponding to the second user utterance from the intelligence server 201, may execute the second app 135_2 based on the received plan (for example, action order), an may output the result of performing the task (for example, function) by using the second app 135_2.

Figure 15:
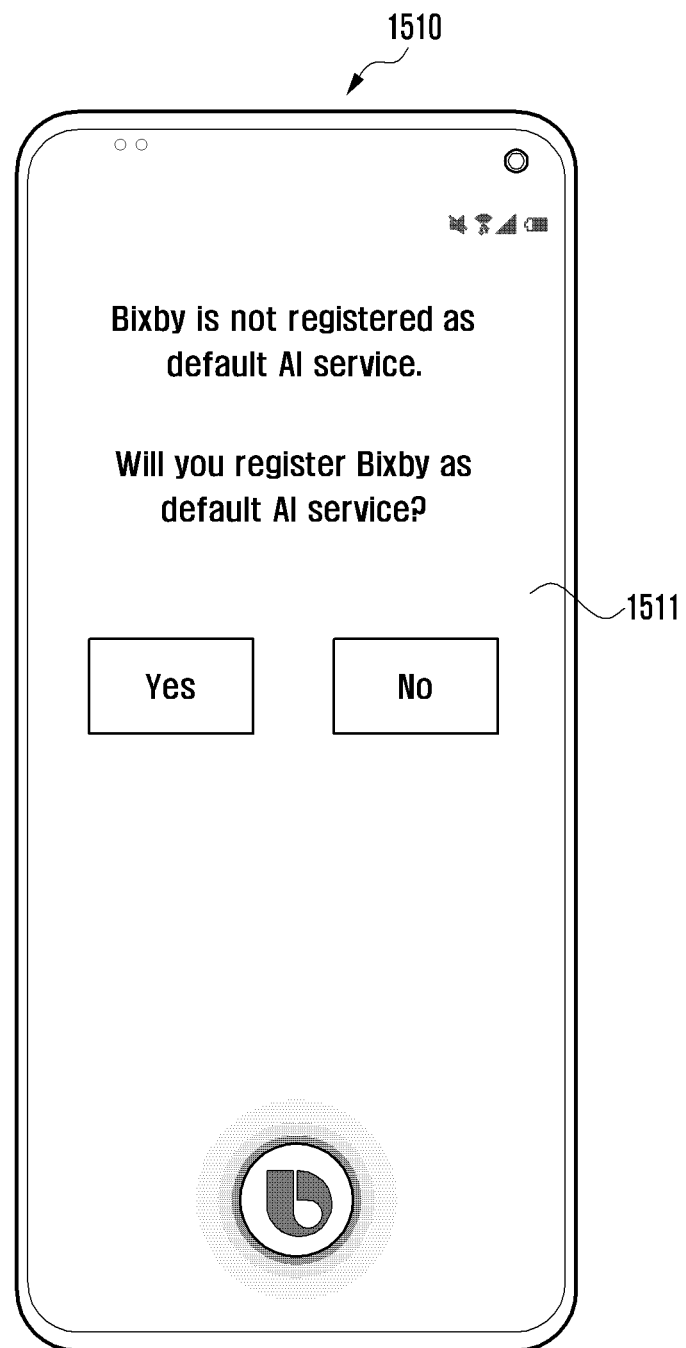
FIG. 15 illustrates an exemplary user interface used by an electronic device according to an embodiment to configure a specific intelligence app as a default AI service.

FIG. 15 illustrates an exemplary user interface used by an electronic device according to an embodiment to configure a specific intelligence app as a default AI service.

Referring to FIG. 15, the electronic device 101 according to an embodiment may store multiple intelligence apps (for example, BIXBY™ or GOOGLE ASSISTANT™, and may configure one intelligence app (for example, BIXBY™ app 752 in FIG. 7) as a default app. According to an embodiment, the electronic device 101 may provide a configuration screen 1510 for configuring a specific intelligence app 752 as a default app. For example, when the intelligence app 752 is initially executed as illustrated in FIG. 15, the electronic device 101 may display a user interface 1511 for configuring the corresponding intelligence app (such as the BIXBY™ app 752) as the default app.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a communication interface;
   a display;
   memory storing computer programs including an intelligence application configured to process a voice input associated with at least one of a first application and a second application, wherein the first application and the second application are different from the intelligence application; and
   a processor operatively coupled with the communication interface, the display, and the memory, the processor configured to execute one or more of the computer programs stored in the memory to cause the electronic device to:
      connect the electronic device, via the communication interface, to an external electronic device;
      receive, via the communication interface, a first voice input including a wake-up utterance from the external electronic device;
      in response to receiving the first voice input, cause an execution of the first application via the intelligence application based on a portion of the first voice input other than the wake-up utterance;
      while the execution of the first application is maintained, receive a designated event corresponding to the second application;
      after the receiving of the designated event and before a time associated with the designated event elapses, receive, via the communication interface, while the execution of the first application is maintained, a second voice input related to the designated event from the external electronic device, wherein the second voice input does not include the wake-up utterance; and
      in response to the receiving of the second voice input after the receiving of the designated event and before the time associated with the designated event elapses, control the intelligence application to cause performance of a task of the second application corresponding to the second voice input.

2. The electronic device of claim 1, wherein the designated event includes at least one of a notification or an incoming call.

3. The electronic device of claim 2, wherein the processor is further configured to output music to the external electronic device via the communication interface as at least part of the execution of the first application, based on the portion of the first voice input other than the wake-up utterance.

4. The electronic device of claim 3, wherein the processor is further configured to:
   control the intelligence application to stop the execution of the first application in response to the receiving of the designated event; and
   after the task is performed in response to the second voice input, control the intelligence application to return to the execution of the first application.

5. The electronic device of claim 1, wherein the processor is further configured to:
   after the receiving of the designated event and before the time associated with the designated event elapses, receive, via the communication interface, while the execution of the first application is maintained, a third voice input related to the first application, wherein the third voice input does not include the wake-up utterance; and
   in response to receiving the third voice input, control the intelligence application to cause an execution of a function of the first application corresponding to the third voice input.

6. The electronic device of claim 1, wherein the processor is further configured to, after the receiving of the designated event and before the time associated with the designated event elapses, display a user interface related to the second application.

7. The electronic device of claim 6, wherein the processor is further configured to display an execution screen of the second application in response to receiving an input associated with the user interface related to the second application.

8. The electronic device of claim 1, wherein the processor is further configured to analyze data related to the designated event.

9. The electronic device of claim 8, wherein the data related to the designated event includes at least one of identification information of the second application, a time at which the designated event occurred, or a type of the designated event.

10. The electronic device of claim 1, wherein the processor is further configured to output, using the second application, a result of performing the task of the second application, wherein the result is at least one of a voice type, a graphic type, or a text type.

11. A method of an electronic device comprising:
   connecting the electronic device, via a communication interface of the electronic device, to an external electronic device;
   receiving, via the communication interface, a first voice input including a wake-up utterance from the external electronic device;
   in response to receiving the first voice input, causing an execution of a first application, via an intelligence application stored in a memory of the electronic device, based on a portion of the first voice input other than the wake-up utterance;
   while the execution of the first application is maintained, receiving a designated event corresponding to a second application;
   after the receiving of the designated event and before a time associated with the designated event elapses, receiving, via the communication interface, while the execution of the first application is maintained, a second voice input related to the designated event from the external electronic device, wherein the second voice input does not include the wake-up utterance; and in response to the receiving of the second voice input after the receiving of the designated event and before the time associated with the designated event elapses, controlling the intelligence application to cause performance of a task of the second application corresponding to the second voice input.

12. The method of claim 11, wherein the designated event includes at least one of a notification or an incoming call.

13. The method of claim 12, further comprising outputting music to the external electronic device via the communication interface as at least part of the execution of the first application, based on the portion of the first voice input other than the wake-up utterance.

14. The method of claim 13, further comprising:
controlling the intelligence application to stop the execution of the first application in response to the receiving of the designated event; and
after the task is performed in response to the second voice input, controlling the intelligence application to return to the execution of the first application.

15. The method of claim 11, further comprising:
after the receiving of the designated event and before the time associated with the designated event elapses, receiving, via the communication interface, while the execution of the first application is maintained, a third voice input related to the first application, wherein the third voice input does not include the wake-up utterance; and
in response to receiving the third voice input, controlling the intelligence application to cause an execution of a function of the first application corresponding to the third voice input.

16. The method of claim 11, further comprising, after the receiving of the designated event and before the time associated with the designated event elapses, displaying a user interface related to the second application.

17. The method of claim 16, further comprising displaying an execution screen of the second application in response to receiving an input associated with the user interface related to the second application.

18. The method of claim 11, further comprising analyzing data related to the designated event.

19. The method of claim 18, wherein the data related to the designated event includes at least one of identification information of the second application, a time at which the designated event occurred, or a type of the designated event.

20. A non-transitory recording medium storing computer programs readable by an electronic device, wherein one of more of the computer programs cause the electronic device to:
connect the electronic device, via a communication interface of the electronic device, to an external electronic device;
receive, via the communication interface, a first voice input including a wake-up utterance from the external electronic device;
in response to receiving the first voice input, cause an execution of a first application, via an intelligence application stored in a memory of the electronic device, based on a portion of the first voice input other than the wake-up utterance;
while the execution of the first application is maintained, receive a designated event corresponding to a second application;
after the receiving of the designated event and before a time associated with the designated event elapses, receive, via the communication interface, while the execution of the first application is maintained, a second voice input related to the designated event from the external electronic device, wherein the second voice input does not include the wake-up utterance; and
in response to the receiving of the second voice input after the receiving of the designated event and before the time associated with the designated event elapses, control the intelligence application to cause performance of a task of the second application corresponding to the second voice input.

* * * * *